United States Patent
Lee et al.

(10) Patent No.: US 9,860,830 B2
(45) Date of Patent: Jan. 2, 2018

(54) CELL SELECTION METHOD AND ELECTRONIC DEVICE

(71) Applicant: SAMSUNG ELECTRONICS CO., LTD., Suwon-si, Gyeonggi-do (KR)

(72) Inventors: Keon-Young Lee, Gwacheon-si (KR); Yu-Shin Kim, Hwaseong-si (KR); Kyoung-Ho Lee, Namyangju-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/299,718

(22) Filed: Oct. 21, 2016

(65) Prior Publication Data

US 2017/0118700 A1    Apr. 27, 2017

(30) Foreign Application Priority Data

Oct. 22, 2015    (KR) .................. 10-2015-0147636

(51) Int. Cl.
*H04W 4/00*    (2009.01)
*H04W 48/16*    (2009.01)
*H04W 48/20*    (2009.01)

(52) U.S. Cl.
CPC ........... *H04W 48/16* (2013.01); *H04W 48/20* (2013.01)

(58) Field of Classification Search
CPC ............................. H04W 48/16; H04W 48/20
USPC ........... 455/435.2–435.3, 434, 464, 524, 525
See application file for complete search history.

(56) References Cited

U.S. PATENT DOCUMENTS

| | | | |
|---|---|---|---|
| 8,744,439 B2 | 6/2014 | Deivasigamani et al. | |
| 2014/0200001 A1* | 7/2014 | Song | H04W 36/0094 455/436 |
| 2015/0319744 A1* | 11/2015 | Jung | H04W 24/10 370/328 |
| 2015/0373601 A1* | 12/2015 | Benjebbour | H04W 72/082 370/252 |
| 2016/0007213 A1* | 1/2016 | Cui | H04W 4/005 370/230 |
| 2016/0050590 A1* | 2/2016 | Ponukumati | H04B 17/309 455/437 |

FOREIGN PATENT DOCUMENTS

WO    WO 2015-084046    6/2015

* cited by examiner

*Primary Examiner* — Wayne Cai
(74) *Attorney, Agent, or Firm* — Nixon & Vanderhye P.C.

(57) ABSTRACT

A method for selecting a cell by an electronic device including a plurality of antennas includes obtaining first received power-related information for a reference signal received from a first cell of a first network through a first antenna of the plurality of antennas configured to transmit and receive signals, determining whether the first received power-related information meets a preset first condition, and when the first received power-related information meets the first condition, forming a connection with the first cell or transmitting at least a portion of the first received power-related information to the first cell or a second cell of the first network.

20 Claims, 13 Drawing Sheets

CELL SELECTION METHOD AND ELECTRONIC DEVICE

CROSS-REFERENCE TO RELATED APPLICATION(S)

This application is based on and claims priority under 35 U.S.C. §119 to a Korean patent application filed in the Korean Intellectual Property Office on Oct. 22, 2015 and assigned Serial No. 10-2015-0147636, the disclosure of which is incorporated by reference herein in its entirety.

TECHNICAL FIELD

The present disclosure relates generally to methods for selecting one of a plurality of cells configuring a communication network and electronic devices for the same.

DISCUSSION OF RELATED ART

Generally, communication networks have been developed to guarantee user activity while providing voice services. However, communication networks expand their service coverage to data services as well as voice services and are evolving to provide high-speed, high-capacity services to users' electronic devices. Representative examples of such communication networks include long-term evolution (LTE) mobile communication networks, long-term evolution-advanced (LTE-A) mobile communication networks, high speed downlink packet access (HSDPA) mobile communication networks, high speed uplink packet access (HSUPA) mobile communication networks, wideband code division multiple access (WCDMA) mobile communication networks, $3^{rd}$ generation project partnership 2 (3GPP2) high rate packet data (HRPD) mobile communication networks, code division multiple access (CDMA) mobile communication networks, institute of electrical and electronics engineers (IEEE) 802.16m communication networks, evolved packet system (EPS), and mobile Internet protocol (mobile IP) networks.

An electronic device may include a plurality of antennas for connection and communication with a network. The plurality of antennas may include at least one antenna (i.e., Tx-Rx antenna) configured to transmit and receive signals/data and a plurality of antennas (i.e., Rx antennas) configured to receive only signals.

For example, the received power of a reference signal received by each antenna in the electronic device may vary depending on, e.g., the position of the electronic device and cell, direction of the electronic device, and surrounding environment of the electronic device.

For example, when the user hides the Tx-Rx antenna in a region where the reference signal received by the antenna is weak, if a cell is selected based on the received power of the reference signal received by a Rx antenna not hidden by the user, the cell fails to receive signals transmitted by the electronic device through the Tx-Rx antenna, resulting in the electronic device failing to connect with the cell or data transmission significantly slowing down.

The above information is presented as background information only to assist with an understanding of the present disclosure. No determination has been made, and no assertion is made, as to whether any of the above might be applicable as prior art with regard to the present disclosure.

SUMMARY

Thus, a need exists for a cell selection method capable of raising the chance of success in connection between the electronic device and the cell or data transmission speed.

According to an example embodiment of the present disclosure, a method for selecting a cell by an electronic device including a plurality of antennas comprises obtaining first received power-related information of a reference signal received from a first cell of a first network through a first antenna configured to transmit and receive signals among the plurality of antennas, determining whether the first received power-related information meets (i.e., satisfies) a preset first condition, and when the first received power-related information meets the first condition, forming a connection with the first cell or transmitting at least a portion of the first received power-related information to the first cell or a second cell of the first network.

According to an example embodiment of the present disclosure, an electronic device may include a plurality of antennas and a processor configured to obtain first received power-related information of a reference signal received from a first cell of a first network through a first antenna configured to transmit and receive signals among the plurality of antennas, to determine whether the first received power-related information meets a preset first condition, and when the first received power-related information meets the first condition, to form a connection with the first cell or to transmit at least a portion of the first received power-related information to the first cell or a second cell of the first network.

According to an example embodiment of the present disclosure, a cell selection method capable of raising the chance of success in connection between the electronic device and the cell or data transmission speed is provided.

According to an example embodiment of the present disclosure, received power-related information (e.g., RSRP or RSRQ) for the Tx-Rx antenna is first taken into account upon cell selection, thus preventing and/or reducing various issues, e.g., RACH failure, due to a deterioration of transmission quality after the cell selection.

According to an example embodiment of the present disclosure, received power-related information for the Tx-Rx antenna is first used for cell reselection and/or measurement report for an RRC connected state, preventing a RACH failure or radio link failure due to a deterioration of transmission quality upon a handover.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete appreciation of example aspects, advantages and features of the present disclosure will become more apparent from the following detailed description, taken in conjunction with the accompanying drawings, in which like reference numerals refer to like elements, and wherein.

DETAILED DESCRIPTION

Figure 1:
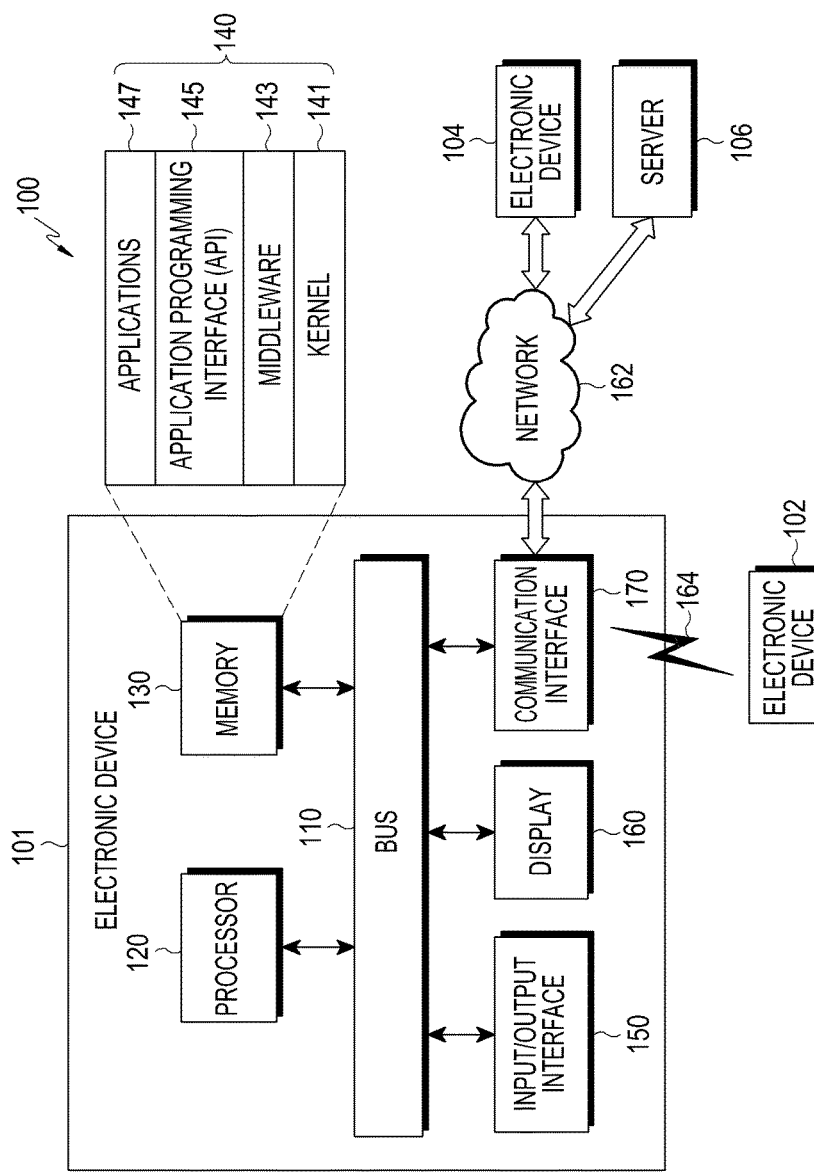
FIG. 1 is a diagram illustrating an example electronic device in a network environment according to an example embodiment of the present disclosure.

Hereinafter, example embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not necessarily mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler), or the like, but is not limited thereto.

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves), or the like, but is not limited thereto. According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor 120, a memory 130, an input/output interface (e.g., including input/output circuitry) 150, a display 160, and a communication interface (e.g., including communication circuitry) 170. In some embodiments, the electronic device 101 may exclude at least one of the components or may add another component.

The bus 110 may include a circuit for connecting the components 120, 130, 150, 160, and 170 with one another and transferring communications (e.g., control messages and/or data) between the components.

The processing module 120 may include various processing circuitry, such as, for example, and without limitation, one or more of a central processing unit (CPU), an application processor (AP), or a communication processor (CP). The processor 120 may perform control on at least one of the other components of the electronic device 101, and/or perform an operation or data processing relating to communication. The processor 120 may be denoted a controller, or the processor 120 may include a controller as part thereof or may configure the controller.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may include various input/output circuitry configured to serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may include various communication circuitry configured to set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device. The communication interface 170 may include a communication processor (CP), and the communication processor may configure one of a plurality of modules in the communication interface 170. According to an embodiment of the present disclosure, the communication processor may be included in the processor 120.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
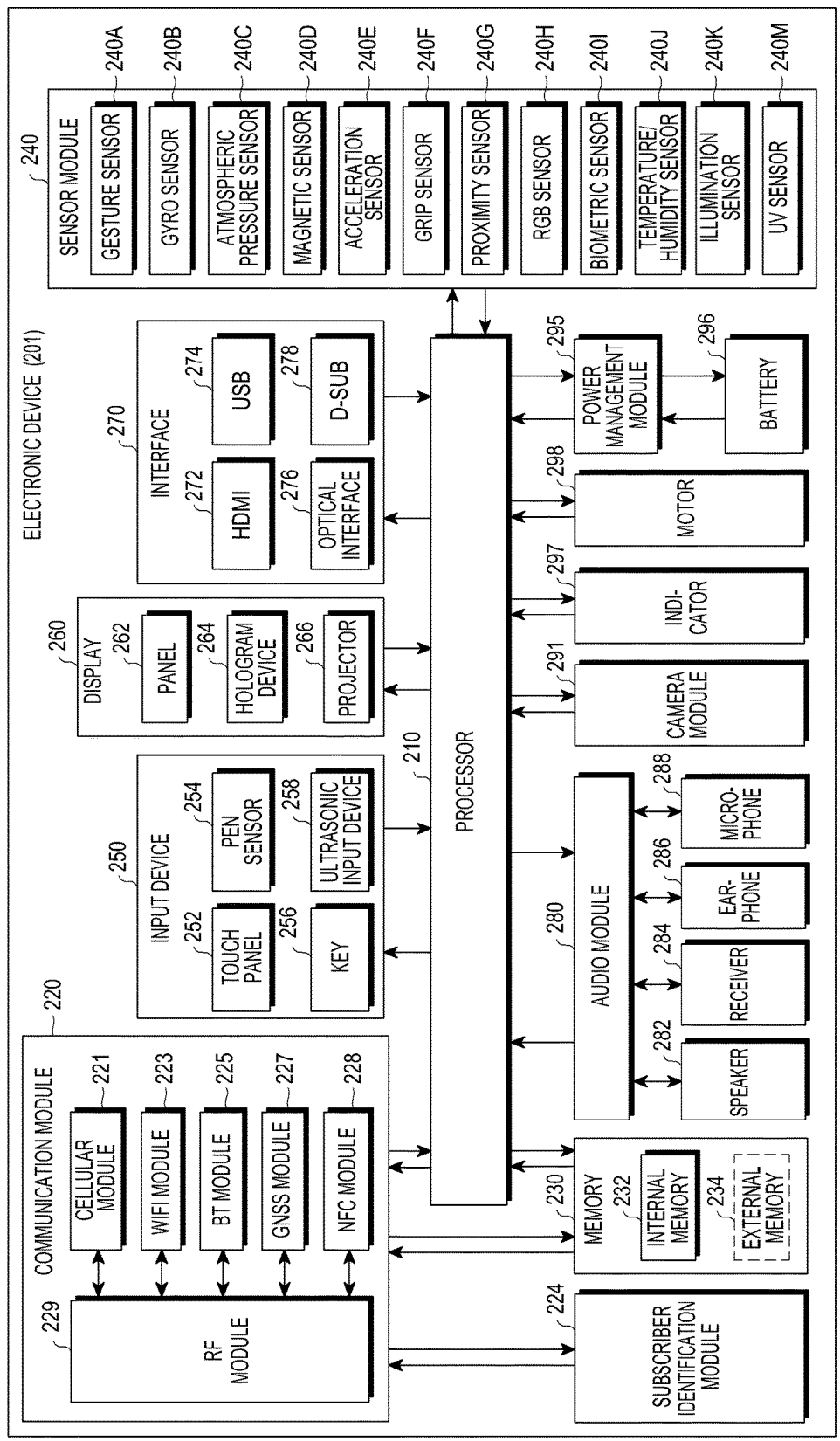
FIG. 2 is a block diagram illustrating an example electronic device according to an example embodiment of the present disclosure.

FIG. 2 is a block diagram illustrating an example electronic device 201 according to an example embodiment of the present disclosure. The electronic device 201 may include the whole or part of the configuration of, e.g., the electronic device 101 illustrated in FIG. 1. The electronic device 201 may include one or more processors (e.g., application processors (APs)) 210, a communication module (e.g., including communication circuitry) 220, a memory 230, a sensor module 240, an input device (e.g., including input circuitry) 250, and a display 260, and the electronic device 201 may further include at least one of a subscription identification module 224, an interface (e.g., including interface circuitry) 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components illustrated in FIG. 2. The processor 210 may load a command or data received from at least one of other components (e.g., a non-volatile memory) on a volatile memory, process the command or data, and store various data in the non-volatile memory.

The communication module 220 may include various communication circuitry and have the same or similar configuration to the communication interface 170 of FIG. 1. The communication module 220 may include various communication circuitry, such as, for example, and without limitation, at least one of, e.g., a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth module 225, the GNSS module 227, or the NFC module 228 may include a process for, e.g., processing data communicated through the module. According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include various sensors, such as, for example, and without limitation, at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a biometric sensor 240I, a temperature/humidity sensor 240J, an illumination (e.g., light) sensor 240K, or an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 10 may control the sensor module 240 while the processor 11 is in a sleep mode.

The input unit 250 may include various input circuitry, such as, for example, and without limitation, a touch panel 252, and the input device 250 may further include input circuitry such as at least one of a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or keypad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, and the display 260 may further include a hologram device 264 and/or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include various interface circuitry, such as, for example, and without limitation, at least one of, e.g., a High Definition Multimedia Interface (HDMI) 272, a USB 274, an optical interface 276, or a D-subminiature (D-sub) 278. The interface 270 may be included in e.g., the communication interface 170 illustrated in FIG. 1. Additionally or alternatively, the interface 270 may include a Mobile High-definition Link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as illustrated in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. According to an embodiment of the present disclosure, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
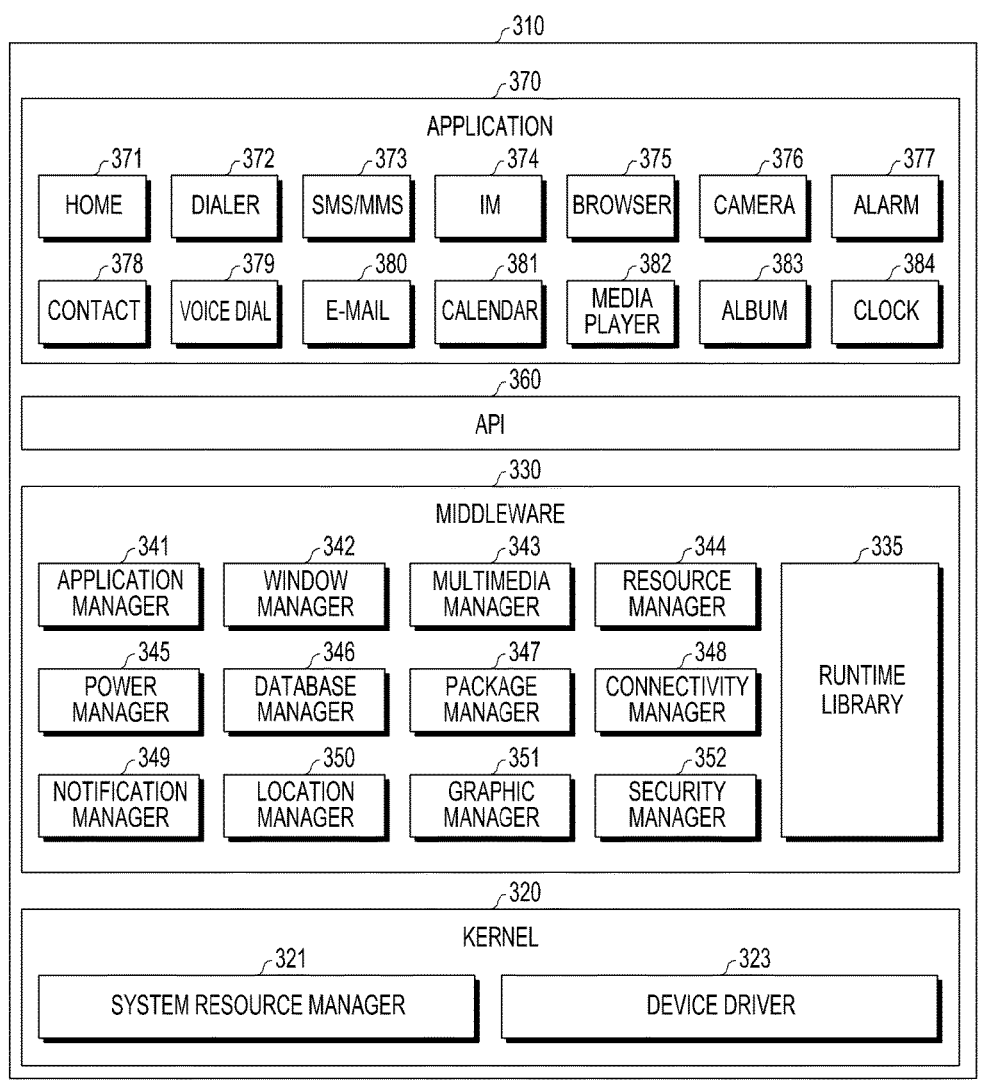
FIG. 3 is a block diagram illustrating an example program module according to an example embodiment of the present disclosure.

FIG. 3 is a block diagram illustrating an example program module according to an example embodiment of the present disclosure. According to an example embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the illustrated embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

Figure 4:
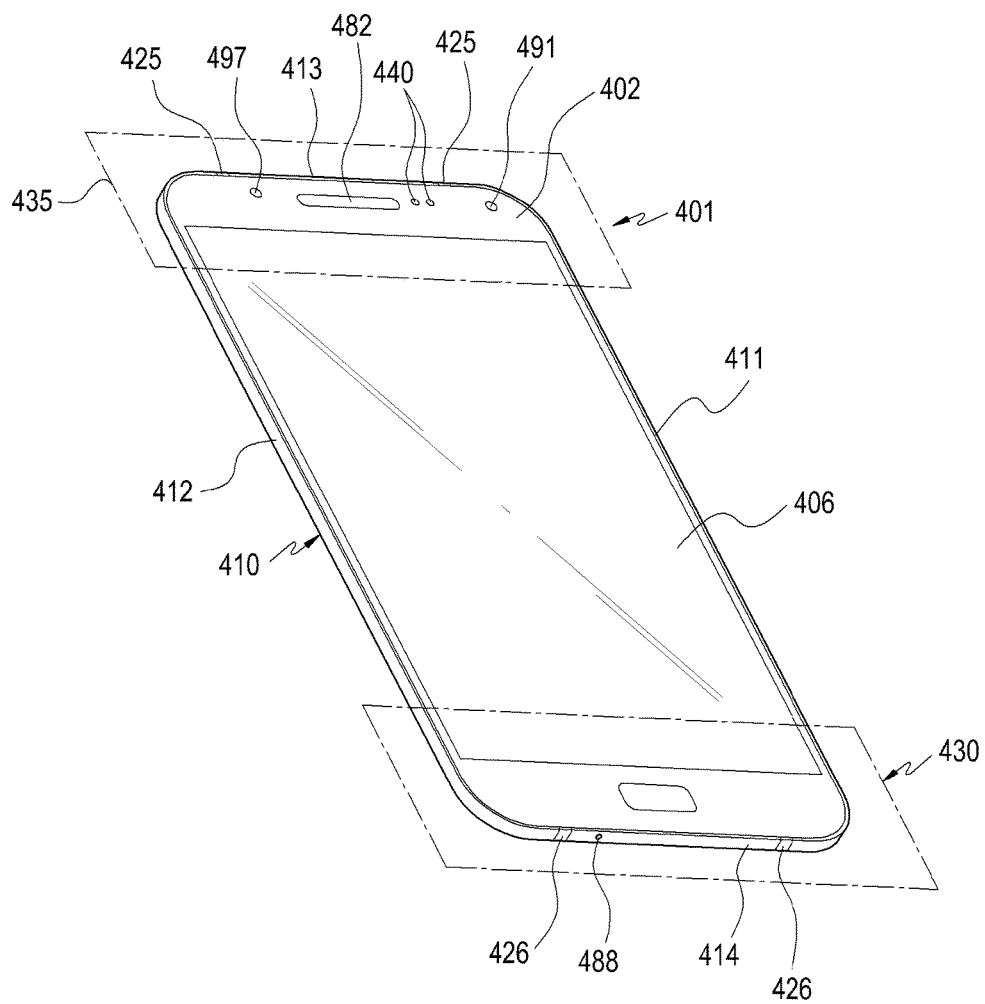
FIG. 4 is a perspective view illustrating an example electronic device according to an example embodiment of the present disclosure.

FIG. 4 is a perspective view illustrating an example electronic device according to an example embodiment of the present disclosure.

Referring to FIG. 4, the electronic device 401 (e.g., the electronic device 101 or 201) may have a display 406 (e.g., the display 160 or 260) on a front surface thereof. A speaker device 482 (e.g., the speaker 282) may be installed on an upper side of the display 406 (or an upper portion of the front surface of the electronic device 401) to receive an opposite party's voice. A microphone device 488 (e.g., the microphone 288) may be installed on a lower side of the display 406 to send a voice of the user of the electronic device to the opposite party.

According to an embodiment of the present disclosure, components for performing various functions of the electronic device 401 may be arranged around the speaker device 482. The components may include at least one sensor module 440. The sensor module 440 (e.g., the sensor module 240) may include at least one of, e.g., an illumination sensor (e.g., an optical sensor), a proximity sensor, an infrared (IR) sensor, or an ultrasonic sensor. According to an embodiment of the present disclosure, the components may include a camera device 491 (e.g., the camera module 291). According to an embodiment of the present disclosure, the components may include a light emitting diode (LED) indicator 497 to provide state information about the electronic device 401 to the user.

According to an embodiment of the present disclosure, the electronic device 401 may include a metal bezel 410 (which may be provided as at least a portion of a metal housing). According to an embodiment of the present disclosure, the metal bezel 410 may be formed along an edge of the electronic device 401 and may expand to at least a portion of the rear surface of the electronic device 401, which extends from the edge. According to an embodiment of the present disclosure, the metal bezel 410 may be defined as a thickness of the electronic device 401 along the edge of the electronic device 401 and may be shaped as a loop. However, the metal bezel 410 is not limited thereto, and the metal bezel 410 may be formed in such a manner as to at least partially contribute to the thickness of the electronic device 401. According to an embodiment of the present disclosure, the metal bezel 410 may be formed only in at least a portion of the edge of the electronic device 410. According to an embodiment of the present disclosure, the metal bezel 410 may include at least one separator 425 and 426. According to an embodiment of the present disclosure, unit bezel portions separated by the separators 425 and 426 may be utilized as antennas operating on at least one frequency band.

According to an embodiment of the present disclosure, the metal bezel 410 may be shaped as a loop along the edge and may be disposed in such a way as to contribute, in whole or part, to the thickness of the electronic device 401. According to an embodiment of the present disclosure, when the electronic device 401 is viewed from front, the metal bezel 410 may include a right bezel portion 411, a left bezel portion 412, an upper bezel portion 413, and a lower bezel portion 414. Here, the lower bezel portion 414 may provide a unit bezel portion formed by a pair of separators 426.

According to an embodiment of the present disclosure, a main antenna device (or a first radio frequency (RF) module (e.g., the RF module 229)) may be disposed in a main antenna area 430 which is a lower portion of the electronic antenna device 401. According to an embodiment of the present disclosure, the lower bezel portion 414 may be used as a main antenna by the pair of separators 426. According to an embodiment of the present disclosure, the lower bezel portion 414 may operate as an antenna on at least two operating frequency bands according to the position of powering. For example, the lower bezel portion 414 may be part of an antenna supporting a low/middle bandwidth (L/MB) and/or high/middle bandwidth (H/MB).

According to an embodiment of the present disclosure, the configuration of the antenna device is merely an example, and the above-described functions of the lower bezel portion 414 may be instead or together performed by the upper bezel portion 413 separated by other separators 425.

According to an embodiment of the present disclosure, a diversity antenna device (or a second RF module (e.g., the RF module 229)) may be disposed in a diversity antenna area 435 that is an upper portion of the electronic device 401. According to an embodiment of the present disclosure, the upper bezel portion 413 may be used as a diversity antenna by the pair of separators 425. According to an embodiment of the present disclosure, the upper bezel portion 413 may operate as an antenna on at least two operating frequency bands according to the position of powering. For example, the upper bezel portion 413 may be part of an antenna supporting an L/MB and/or H/MB. For example, the diversity antenna device may be utilized as an antenna for diversity/multi input multi output (MIMO). For example, the upper bezel portion 413 may be part of a diversity antenna supporting an L/MB and/or H/MB.

According to an embodiment of the present disclosure, part of the right bezel portion 411 or part of the left bezel portion 412 may also be powered to operate as an antenna. For example, the part of the right bezel portion 411 or the part of the left bezel portion 412 may be part of an antenna supporting an L/MB and/or H/MB. A part of the right bezel portion 411 and/or a part of the left bezel portion 412 included in the main antenna area 430 may operate as the main antenna. A part of the right bezel portion 411 and/or a part of the left bezel portion 412 included in the diversity antenna area 435 may operate as the diversity antenna.

Figures 5A, 5B:
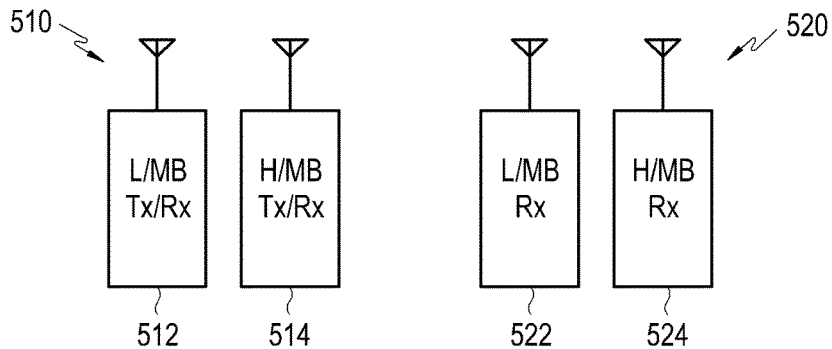
FIGS. 5A and 5B are diagrams illustrating example antenna devices according to an example embodiment of the present disclosure.

FIGS. 5A and 5B are diagrams illustrating example antenna devices according to an example embodiment of the present disclosure.

Referring to FIG. 5A, the main antenna device 510 (e.g., the RF module 229) may include a first Tx/Rx antenna 512 (e.g., the RF module 229) configured to transmit and/or receive L/MB signals and a second Tx/Rx antenna 514 (e.g., the RF module 229) configured to transmit and/or receive H/MB signals.

Referring to FIG. 5B, the diversity antenna device 520 (e.g., the RF module 229) may include a first Rx antenna 522 (e.g., the RF module 229) configured to only receive L/MB signals and a second Rx antenna 524 (e.g., the RF module 229) configured to only receive H/MB signals.

For example, the main antenna device 510 may transmit and/or receive signals on one frequency band, and the diversity antenna device 520 may receive a signal of the same frequency band, supporting 2nd order diversity/MIMO.

Figure 6:
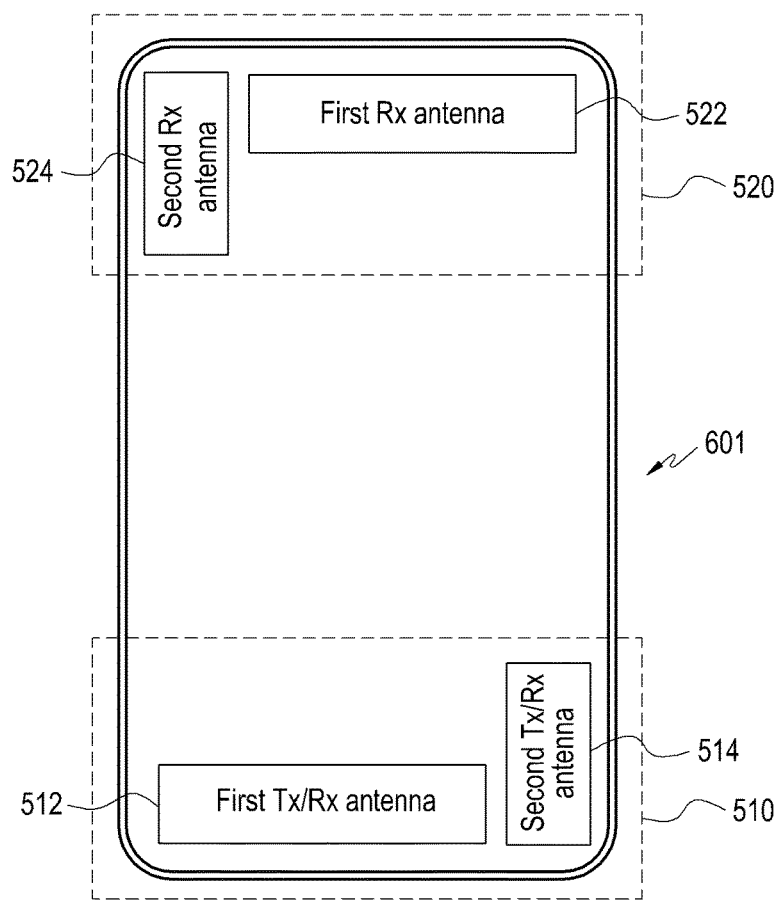
FIG. 6 is a diagram illustrating an example arrangement of antenna devices according to an example embodiment of the present disclosure.

FIG. 6 is a diagram illustrating an example arrangement of antenna devices according to an example embodiment of the present disclosure.

For example, the first Tx/Rx antenna 512 may support an L/MB and H/MB, and the second Tx/Rx antenna 514 may support an H/MB. The L/MB has a relatively long wavelength, resulting in an increase in the antenna size. Thus, a plurality of (i.e., two or more) antennas supporting the L/MB may be difficult to be included in a lower portion of the electronic device 601 (e.g., the electronic device 101, 201, or 401). Further, when a plurality of antennas supporting the L/MB are included in a lower portion of the electronic device 601, the distance between the antennas shortens, possibly causing problems with correlation or isolation. This is why a longer wavelength leads to an increase in the antenna separation distance required for diversity or MIMO operation.

In order to enhance correlation/isolation characteristics, the main antenna device 510 may be disposed in a lower portion (or a first end portion) of the electronic device 601, and the diversity antenna device 520 (e.g., the RF module 229) may be disposed in an upper portion (or a second end portion) of the electronic device 601.

The diversity antenna device 520 may include a first Rx antenna 522 (e.g., the RF module 229) configured to only receive L/MB signals and a second Rx antenna 524 (e.g., the RF module 229) configured to only receive H/MB signals.

In such configuration, although the electronic device 601 includes a plurality of L/MB antennas, an available antenna separation distance may be secured in the electronic device 601.

Figure 7:
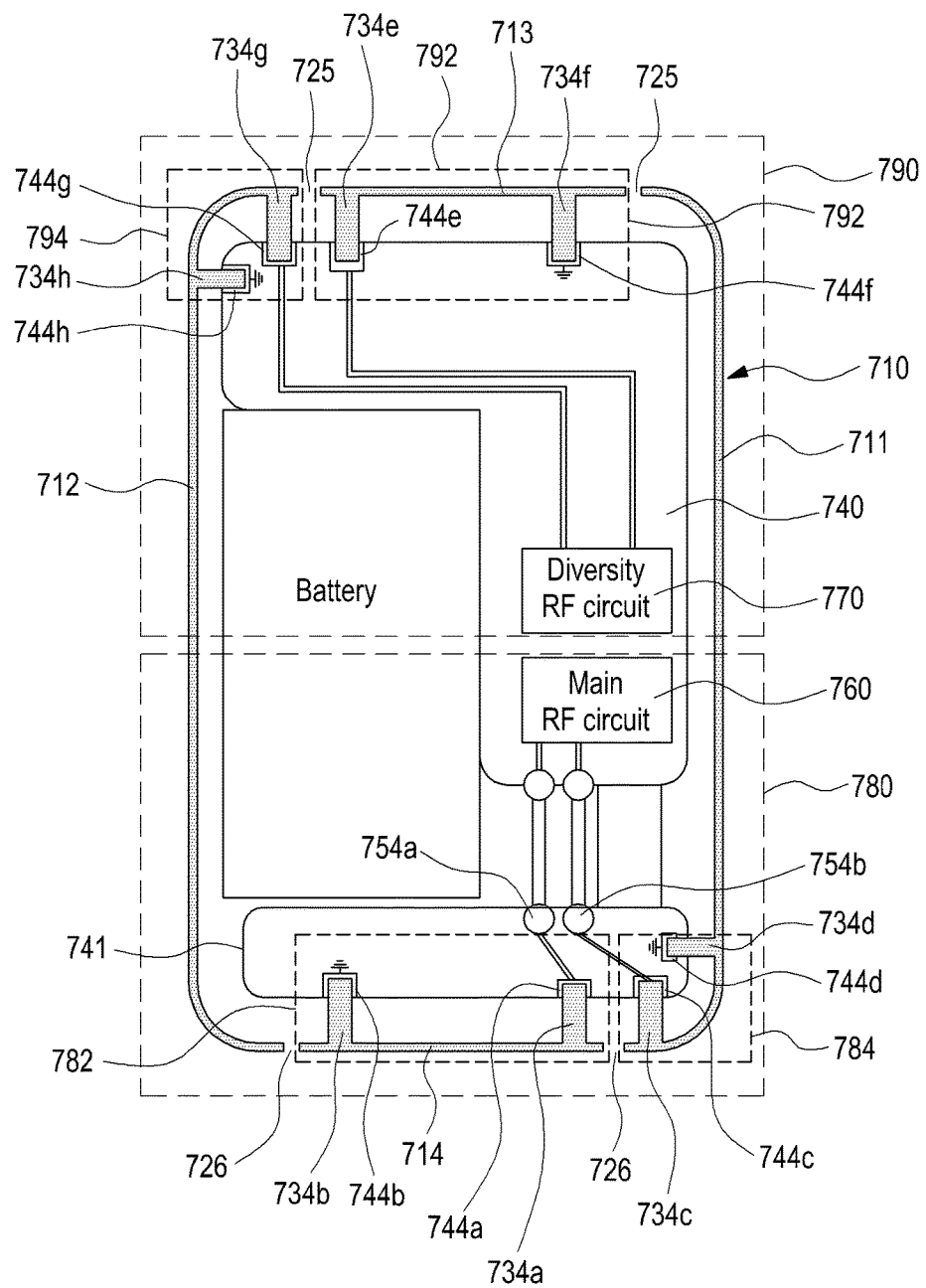
FIG. 7 is a diagram illustrating an example configuration of an antenna device according to an example embodiment of the present disclosure.

FIG. 7 is a diagram illustrating an example configuration of an antenna device according to an example embodiment of the present disclosure. According to an example embodiment of the present disclosure, the metal bezel 710 illustrated in FIG. 7 may be similar to the metal bezel of FIG. 4 or a different one.

Referring to FIG. 7, the metal bezel 710, when viewed from front, may include a right bezel portion 711, a left bezel portion 712, a lower bezel portion 714, and an upper bezel portion 713. According to an embodiment of the present disclosure, the lower bezel portion 714 may remain separated from the right bezel portion 711 and the left bezel portion 712 by a pair of separators 726 formed at a predetermined interval. The upper bezel portion 713 may remain separated from the right bezel portion 711 and the left bezel portion 712 by a pair of separators 725 formed at a predetermined interval. According to an embodiment of the present disclosure, the pair of separators 725 and 726 may be formed of a dielectric. According to an embodiment of the present disclosure, the pair of separators 725 and 726 may be formed in such a manner that a synthetic resin is double-injected, double-molded or insert molded in the metal bezel 710 formed of a metal. However, the pair of separators 725 and 726 may adopt other various insulative materials or substances without limited thereto.

According to an embodiment of the present disclosure, a predetermined first powering piece 734a, together with the lower bezel portion 714, may be formed as a single body, and the first powering piece 734a may be powered by a first powering portion 754a of a sub-board 741. According to an embodiment of the present disclosure, the first powering piece 734a of the lower bezel portion 714 may be connected to the first powering portion 754a of the sub-board 741 or electrically connected by a separate electrical connecting member (e.g., a C clip) simply by the operation that the sub-board 741 is installed in the electronic device (e.g., the electronic device 101, 201, 401, or 601).

According to an embodiment of the present disclosure, a first powering pad 744a may be disposed on the sub-board 741, and the first powering pad 744a may be electrically connected with the first powering piece 734a of the lower bezel portion 714. According to an embodiment of the present disclosure, a first electrical path (e.g., a wiring line) may be formed from the first powering pad 744a to the first powering portion 754a. The lower bezel portion 714 may be a portion of a first Tx/Rx antenna 782 (e.g., the first Tx/Rx antenna 512) of a main antenna device 780 (e.g., the main antenna device 510) supporting an L/MB and/or H/MB. A portion of the right bezel portion 711 may be a portion of a second Tx/Rx antenna 784 (e.g., the second Tx/Rx antenna 514) of the main antenna device 780 supporting an L/MB and/or H/MB. The right bezel portion 711 may be powered in the same manner as the lower bezel portion 714.

According to an embodiment of the present disclosure, a first grounding piece 734b may be formed along with the lower bezel portion 714 as a single body at a position spaced apart from the first powering piece 734a at a predetermined interval, and the first grounding piece 734b may be grounded to a first grounding portion of the sub-board 741. According to an embodiment of the present disclosure, the first grounding piece 734b of the lower bezel portion 714 may be grounded to the first grounding portion of the sub-board 741 or electrically connected by a separate electrical connecting member (e.g., a C clip) simply by the operation that the sub-board 741 is installed in the electronic device.

According to an embodiment of the present disclosure, a first grounding pad 744b may be disposed on the sub-board 741, and the first grounding pad 744b may be electrically connected with the first grounding piece 734b of the lower bezel portion 714. According to an embodiment of the present disclosure, a second electrical path (e.g., a wiring line) may be formed from the first grounding pad 744b to the first grounding portion.

According to an embodiment of the present disclosure, a predetermined second powering piece 734c, together with the right bezel portion 711, may be formed as a single body, and the second powering piece 734c may be powered by a second powering portion 754b of the sub-board 741. According to an embodiment of the present disclosure, the second powering piece 734c of the right bezel portion 711 may be connected to the second powering portion 754b of the sub-board or electrically connected by a separate electrical connecting member (e.g., a C clip) simply by the operation that the sub-board 741 is installed in the electronic device.

According to an embodiment of the present disclosure, a second powering pad 744c may be disposed on the sub-board 741, and the second powering pad 744c may be electrically connected with the second powering piece 734c of the right bezel portion 711. According to an embodiment of the present disclosure, a third electrical path (e.g., a wiring line) may be formed from the second powering pad 744c to the second powering portion 754b. A portion of the right bezel portion 711 may be a portion of a second Tx/Rx antenna 784 of the main antenna device 780 supporting an L/MB and/or H/MB.

According to an embodiment of the present disclosure, a second grounding piece 734d may be formed along with the right bezel portion 711 as a single body at a position spaced apart from the separator 726 at a predetermined interval, and the second grounding piece 734d may be grounded to a second grounding portion of the sub-board 741. According to an embodiment of the present disclosure, the second grounding piece 734*d* of the right bezel portion 711 may be grounded to the second grounding portion of the sub-board 741 or electrically connected by a separate electrical connecting member (e.g., a C clip) simply by the operation that the sub-board 741 is installed in the electronic device.

According to an embodiment of the present disclosure, a second grounding pad 744*d* may be disposed on the sub-board 741, and the second grounding pad 744*d* may be electrically connected with the second grounding piece 734*d* of the right bezel portion 711. According to an embodiment of the present disclosure, a fourth electrical path (e.g., a wiring line) may be formed from the second grounding pad 744*d* to the second grounding portion.

The grounding portions and grounding pads 744*b* and 744*d* and the powering portions 754*a* and 754*b* and powering pads 744*a* and 744*c* of the main antenna device 780 may be arranged on the sub-board 741. A main RF circuit 760 of the main antenna device 780 and a diversity RF circuit 770 of the diversity antenna device 790 (e.g., the diversity antenna device 520) may be arranged on a main board 740. The main board 740 and the sub-board 741 may be connected via a flexible printed circuit board (FPCB). The sub-board 741 and the FPCB may be formed as a single body.

The sub-board 741 may be disposed at a lower position than the main board 740 with respect to a vertical line. Thus, parts included in the sub-board 741 may be further spaced apart from an antenna. Further, relatively thick parts, such as a universal serial bus (USB) connector (e.g., the USB 274) or a speaker (e.g., the speaker device 482 or speaker 282), may also be arranged on the sub-board 741.

Transmitted/received signals or received signals of the main RF circuit 760 may be delivered to the first powering portion 754*a* and/or second powering portion 754*b* of the sub-board 741 via coaxial lines.

According to an embodiment of the present disclosure, a transmitted signal of the main RF circuit 760 may be transferred to the first powering portion 754*a* and/or second powering portion 754*b* of the sub-board 741, and a received signal of the main RF circuit 760 may be transferred in a reverse way.

The diversity antenna device 790 may include a first Rx antenna 792 (e.g., the first Rx antenna 522) and a second Rx antenna 794 (e.g., the second Rx antenna 524). The first Rx antenna 792 may include a portion of the upper bezel portion 713, and the second Rx antenna 794 may include a portion of the left bezel portion 712.

The first Rx antenna 792 may support an L/MB and/or H/MB, and the second Rx antenna 794 may support an H/MB. Powering pads 744*e* and 744*g* connected to powering pieces 734*e* and 734*g* and powering portions (or input terminals of the diversity RF circuit 770) of the diversity antenna device 790 and grounding pads 744*f* and 744*h* connected to grounding pieces 734*f* and 734*h* and grounding portions may be arranged on the main board 740. Electrical paths connecting the powering portions with the powering pads 744*e* and 744*g* and electrical paths connecting the grounding portions with the grounding pads 744*f* and 744*h* in the diversity antenna device 790 may be arranged on the main board 740.

According to an embodiment of the present disclosure, when the main antenna device 780 uses a portion of the right bezel portion 711 as the second Tx/Rx antenna 784 for inter-antenna signal separation, the diversity antenna device 790 may use, as the second Rx antenna 794, the left bezel portion 712 which is positioned at an opposite side. Alternatively, when the main antenna device 780 uses the left bezel portion as the second Tx/Rx antenna, the diversity antenna device 790 may use, as the second Rx antenna, the right bezel portion 711 which is positioned at an opposite side.

Figure 8:
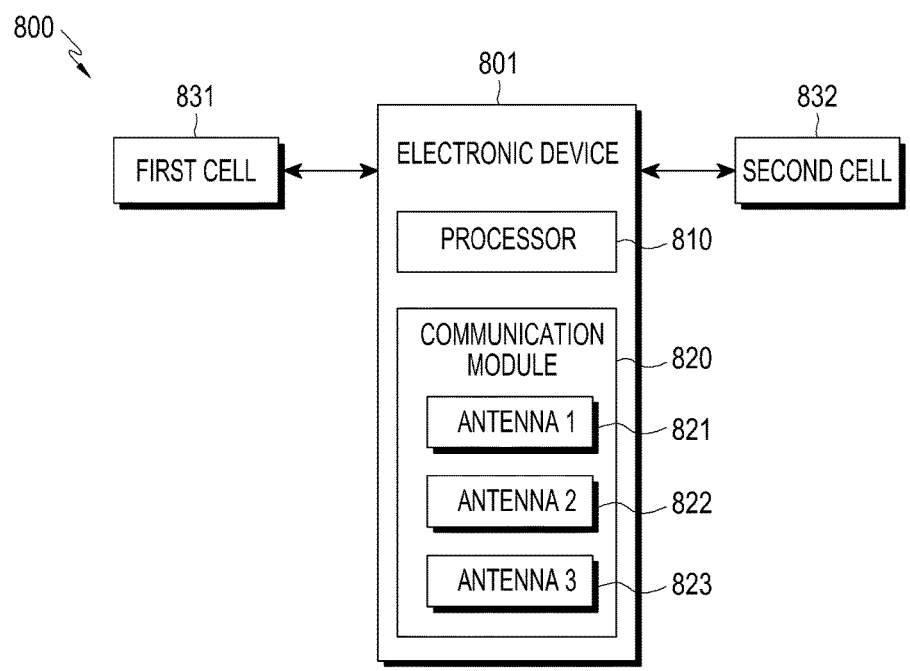
FIG. 8 is a block diagram illustrating an example communication system according to an example embodiment of the present disclosure.

FIG. 8 is a block diagram illustrating an example communication system according to an example embodiment of the present disclosure. The communication system may include an electronic device 801 (e.g., the electronic device 101, 201, 401, or 601), a first cell 831, and a second cell 832.

For example, the first cell 831 and the second cell 832 may be entities in a first network. For example, the first network may include one of a long-term evolution (LTE) network and an IP multimedia subsystem (IMS). The IMS may be included in the LTE network. Each cell 831 and 832 may be a base station (also referred to as an eNodeB or eNB) or one of a plurality of cells connected with at least one base station. Each cell 831 and 832 may be denoted a base station, node, or network entity.

The cells 831 and 832 may be configured to provide different bandwidths and provide a plurality of electronic devices with downlink or uplink communication services. Each cell 831 and 832 may send downlink (DL) scheduling information to the electronic device 801 to provide the electronic device 801 with information about the time/frequency band where data is to be sent, coding information, data size information, and hybrid automatic repeat and request (HARQ)-related information. Further, each cell 831 and 832 may send uplink (UL) scheduling information to the electronic device 801 to provide the electronic device 801 with information about the time/frequency band which the electronic device 801 is to use, coding information, data size information, and HARQ-related information.

The electronic device 801 may include at least one processor 810, and the electronic device 801 may include at least one communication module (e.g., including communication circuitry) 820 or be functionally connected with the at least one communication module 820.

The communication module 820 (e.g., at least one of the communication interface 170, the communication module 220, the cellular module 221, or a LTE module) may communicate with the first network or the cells 831 and 832 of the first network providing packet data (or Internet protocol)-based call services.

The communication module 820 or another communication module (e.g., at least one of the communication interface 170, the communication module 220, the cellular module 221, or a code division multiple access (CDMA) 1× module) may communicate with a second network or a cell of the second network providing circuit switching-based call services. For example, the second network may include a universal terrestrial radio access network (UTRAN), global system for mobile communications (GSM)/enhanced data rates for GSM evolution (EDGE), GSM/EDGE radio access network (GERAN), CDMA2000, CDMA 1×, or its similar network.

The communication module 820 may include a first antenna 821 (e.g., the RF module 229, the main antenna device 510, the Tx/Rx antennas 512, 514, 782 and 784, and/or the like) configured to transmit and/or receive signals, and second and third antennas 822 and 823 (e.g., the RF module 229, the diversity antenna device 520, Rx antennas 522, 524, 792, and 794, and/or the like) configured to only receive signals.

According to an embodiment of the present disclosure, the processor 810 may be provided separately from the communication module 820 or the other communication module, or the processor 810 may be integrated with one of the communication module 820 or the other communication module.

According to an embodiment of the present disclosure, two processors may be integrated with the communication module 820 and the other communication module, respectively, or a first processor may be integrated with one of the communication module 820 or the other communication module while a second processor is provided separately from the communication module 820 or the other communication module. For example, the processor may include at least one communication processor (CP) and/or at least one application processor (AP).

According to an embodiment of the present disclosure, an electronic device (e.g., the electronic device 801) may include a plurality of antennas (e.g., antennas 821, 822, and 823) and a processor (e.g., the processor 810) configured to first select a first antenna (e.g., the first antenna 821) configured to transmit and/or receive signals from among the plurality of antennas, obtain (or produce) first received power-related information for a reference signal (or cell-specific reference signal) received from a first cell (e.g., the first cell 831) of a first network through the first antenna first selected, when the first received power-related information meets a preset condition, form a connection with the first cell or transmit at least a portion of the first received power-related information to the first cell or a second cell (e.g., the second cell 832) of the first network.

According to an embodiment of the present disclosure, an electronic device (e.g., the electronic device 801) may include a plurality of antennas (e.g., the antennas 821, 822, and 823) and a processor (e.g., the processor 810) configured to obtain (or produce) first received power-related information for a reference signal received from a first cell (e.g., the first cell 831) of a first network through a first antenna (e.g., the first antenna 821) configured to transmit and/or receive signals among the plurality of antennas, determine whether the first received power-related information meets a preset first condition, when the first received power-related information meets the first condition, form a connection with the first cell or transmit at least a portion of the first received power-related information to the first cell or a second cell (e.g., the second cell 832) of the first network.

According to an embodiment of the present disclosure, the plurality of antennas may include the first antenna configured to transmit and/or receive signals and a second antenna (e.g., the second or third antenna 822 or 823) configured to only receive signals.

According to an embodiment of the present disclosure, the processor may be configured to first obtain (or produce) received power-related information for a reference signal outputted from the first antenna among the plurality of antennas.

According to an embodiment of the present disclosure, the processor may be configured to first obtain (or produce) received power-related information for a reference signal outputted from the first antenna among the plurality of antennas and/or determine whether the received power-related information meets the first condition.

According to an embodiment of the present disclosure, the processor may be configured to, when the first condition is not met, obtain (or produce) second received power-related information for a corresponding reference signal using at least one value (e.g., a maximum value) or combined value (e.g., a mean value) of received power values or received quality values for reference signals received from the first cell through the plurality of antennas, determine whether the second received power-related information meets the first condition, and when the second received power-related information meets the first condition, form a connection with the first cell or transmit at least a portion of the second received power-related information to the first cell or the second cell.

According to an embodiment of the present disclosure, the processor may be configured to obtain (or produce) second received power-related information for a reference signal received from the first cell through the second antenna when the first condition is not met, determine whether the second received power-related information meets the first condition, and when the second received power-related information meets the first condition, form a connection with the first cell or transmit at least a portion of the second received power-related information to the first cell or the second cell.

According to an embodiment of the present disclosure, the processor may be configured to obtain (or produce) third received power-related information for a reference signal received from the second cell through the first antenna when the first condition is not met, determine whether the third received power-related information meets the first condition, and when the third received power-related information meets the first condition, form a connection with the second cell or transmit at least a portion of the third received power-related information to the first cell or the second cell.

According to an embodiment of the present disclosure, the processor may be configured to determine whether a preset second condition is met, and depending on whether the second condition is met, determine whether to first obtain (or produce) received power-related information for the reference signal outputted from the first antenna among the plurality of antennas and/or to determine whether the received power-related information meets the first condition.

According to an embodiment of the present disclosure, the second condition may include at least one of when the user's grip (i.e., when the user firmly holds the electronic device) is detected or not detected through a sensor (e.g., the grip sensor 240F) of the electronic device, when a difference between a first received power-related value (e.g., a received power value, received quality value, cell selection Rx value, or cell selection quality value) for the reference signal received through the first antenna and a second received power-related value for the reference signal received through the second antenna is not more than (or below) or not less than (or over) a preset threshold (e.g., 5 dB), when the first and/or second received power-related value is varied to be not less or not more than a threshold, when the state where the first and/or second received power-related value is varied to be not less or more than the threshold lasts a preset threshold time or more or less, when the state of the first and/or second received power-related value is the same or similar to a preset state (or belongs to a preset state range), and when the position/state of the electronic device is the same or similar to a preset position/state (or belongs to a preset position/state range).

According to an embodiment of the present disclosure, the processor may be configured to determine whether a preset second condition is met, and when the second condition is met, determine whether to first obtain (or produce) received power-related information for the reference signal outputted from the first antenna among the plurality of antennas and/or to determine whether the received power-related information meets the first condition.

According to an embodiment of the present disclosure, the processor may be configured to determine whether a preset second condition is met and, when the second condition is not met, obtain (or produce) second received power-related information for a corresponding reference signal using at least one value (e.g., a maximum value) or combined value (e.g., a mean value) of received power values or received quality values for reference signals received from the first cell through the plurality of antennas, determine whether the second received power-related information meets the first condition, and when the second received power-related information meets the first condition, form a connection with the first cell or transmit at least a portion of the second received power-related information to the first cell or the second cell.

According to an embodiment of the present disclosure, the first received power-related information may include at least one of a received power value of the reference signal, a received quality value of the reference signal, a cell selection Rx value determined based on a difference between the received power value of the reference signal and a first threshold, and a cell selection quality value determined based on a difference between the received quality value of the reference signal and a second threshold.

According to an embodiment of the present disclosure, the first received power-related information may include at least one of a cell selection Rx value and a cell selection quality value. The cell selection Rx value may be determined based on a difference between the received power value of the reference signal and the third threshold, and the cell selection quality value may be determined based on a difference between the received quality value of the reference signal and the second threshold. The first condition may include a condition where at least one of the cell selection Rx value and the cell selection quality value is larger than a preset threshold (e.g., 0).

According to an embodiment of the present disclosure, the first received power-related information may include at least one of Srxlev and Squal which may, for example, be defined as follows:

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

(where, Srxlev is the cell selection Rx level value (dB), Qrxlevmeas is the measured cell Rx level value (corresponding to the RSRP), Qrxlevmin is the minimum required Rx level in the cell(dBm), Qrxlevminoffset is an offset for Qrxlevmin considered as a result of periodic discovery for a higher-priority public land mobile network (PLMN) while in normal connection with a visiting PLMN, Pcompensation is max(PEMAX−PPowerClass, 0)(dB), PEMAX is the maximum Tx power level value (dBm) available when the user equipment (UE) performs transmission on uplink in the cell, PPowerClass is the maximum RF output power (dBm) of the UE as per power class, Qoffsettemp is the offset (dB) temporarily applied to the cell, Squal is the cell selection quality value (dB), Qqualmeas is the measured cell quality value (corresponding to the RSRQ), and Qqualmin is the minimum required quality level in the cell)

According to an embodiment of the present disclosure, the processor may be configured to, when the first condition is not met, obtain (or produce) second received power-related information for a corresponding reference signal using at least one value (e.g., a maximum value) or combined value (e.g., a mean value) of received power values or received quality values for reference signals received from the first cell through the plurality of antennas, determine whether the second received power-related information meets the first condition, and when the second received power-related information meets the first condition, form a connection with the first cell or transmit at least a portion of the second received power-related information to the first cell or the second cell. The first received power-related value may correspond to a RSRP corresponding to a value obtained by linearly averaging the received power of resource elements including a cell-specific reference signal in a measured bandwidth and/or a RSRQ defined by N*RSRP/RSSI (where RSSI is a receiver signal strength indicator and corresponds to the total received power of resource elements in the measured bandwidth, and N corresponds to the number of resource blocks for which the RSSI is measured).

According to an embodiment of the present disclosure, the first received power-related information may be produced based on a RSRP corresponding to a value obtained by linearly averaging the received power of resource elements including a cell-specific reference signal in a measured bandwidth and/or a RSRQ defined by N*RSRP/RSSI (where RSSI is a receiver signal strength indicator and corresponds to the total received power of resource elements in the measured bandwidth, and N corresponds to the number of resource blocks for which the RSSI is measured).

According to an embodiment of the present disclosure, the first condition may, for example, be defined as follows:

$$Srxlev > 0 \text{ AND } Squal > 0,$$

where, $$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

(where, Srxlev is the cell selection Rx level value (dB), Qrxlevmeas is the measured cell Rx level value (i.e., RSRP), Qrxlevmin is the minimum required Rx level in the cell (dBm), Qrxlevminoffset is an offset for Qrxlevmin considered as a result of periodic discovery for a higher-priority public land mobile network (PLMN) while in normal connection with a visiting PLMN, Pcompensation is max(PEMAX−PPowerClass, 0)(dB), PEMAX is the maximum Tx power level value (dBm) available when the user equipment (UE) performs transmission on uplink in the cell, PPowerClass is the maximum RF output power (dBm) of the UE as per power class, Qoffsettemp is the offset (dB) temporarily applied to the cell, Squal is the cell selection quality value (dB), Qqualmeas is the measured cell quality value (corresponding to the RSRQ), and Qqualmin is the minimum required quality level in the cell)

According to an embodiment of the present disclosure, unless the first condition is met, the processor may be configured to form a connection with the second network different from the first network or a third cell of the second network.

According to an embodiment of the present disclosure, the processor may be configured to form a connection with the second cell unless the first condition is met.

According to an embodiment of the present disclosure, the processor may be configured to, when the first condition is met, transmit a random access preamble to the first cell and receive a random access response message including link allocation information from the first cell.

According to an embodiment of the present disclosure, the processor may be configured to, when the first condition is met, transmit a random access preamble to the first cell, receive a random access response message including link allocation information from the first cell, and transmit a radio resource control (RRC) connection request message to the first cell.

According to an embodiment of the present disclosure, the processor may be configured to, when the first condition is met, transmit a random access preamble to the first cell, receive a random access response message including link allocation information from the first cell, transmit a radio resource control (RRC) connection request message to the first cell, and receive a contention resolution message from the first cell in response to the RRC connection request message.

According to an embodiment of the present disclosure, the processor may be configured to receive at least one sync signal from the first cell and obtain a cell ID of the first cell using information included in the sync signal.

According to an embodiment of the present disclosure, the processor may be configured to receive information regarding the first cell from the second cell and form a connection with the first cell using the information regarding the first cell.

According to an embodiment of the present disclosure, the processor may be configured to receive information regarding the first cell from the second cell, transmit a random access preamble to the first cell, and receive a random access response message including link allocation information from the first cell.

Figure 9:
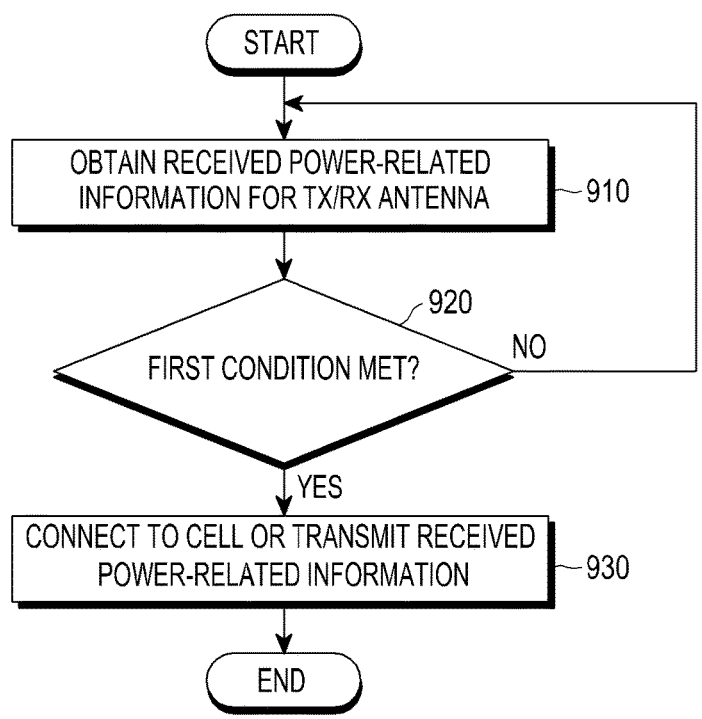
FIG. 9 is a flowchart illustrating an example cell selection method by an electronic device according to an example embodiment of the present disclosure.

FIG. 9 is a flowchart illustrating an example cell selection method by an electronic device according to an example embodiment of the present disclosure. An operation method by the electronic device may include operations 910 to 930. The operation method by the electronic device may be performed by at least any one of the electronic device (e.g., the electronic device 101, 201, 401, 601, or 801), a processor (e.g., the processor 120, 210, or 810) of the electronic device, and a communication device (e.g., the communication interface 170, the communication module 220 or 820, or the cellular module 221) of the electronic device.

In operation 910, the electronic device may obtain (or produce) received power-related information about a Tx/Rx antenna.

For example, the electronic device may include a plurality of antennas (e.g., the RF module 229, a main antenna device 510, Tx/Rx antennas 512, 514, 782, 784, and 821, a diversity antenna device 520, Rx antennas 522, 524, 792, 794, 822, and 823, and/or the like), and the plurality of antennas may include a first antenna (i.e., a Tx/Rx antenna) (e.g., the RF module 229, the main antenna device 510, the Tx/Rx antennas 512, 514, 782, 784, and 821, and/or the like) configured to transmit and/or receive signals, and a second antenna (e.g., the RF module 229, the diversity antenna device 520, the Rx antennas 522, 524, 792, 794, 822, and 823, and/or the like) configured to only receive signals.

For example, the electronic device may first select, from among the plurality of antennas, the first antenna (i.e., a Tx/Rx antenna) (e.g., the RF module 229, the main antenna device 510, the Tx/Rx antennas 512, 514, 782, 784, and 821, and/or the like) configured to transmit and/or receive signals and may obtain (or produce) first received power-related information about a reference signal received from a first cell (e.g., the first cell 831) of a first network through the first antenna first selected.

For example, the reference signal may correspond to a symbol or resource element including the reference signal in a radio frame received from the first cell.

According to an embodiment of the present disclosure, the first received power-related information may include at least one of a received power value of the reference signal (e.g., reference signal received power (RSRP) and/or a measured cell Rx level value ($Q_{rxlevmeas}$)), a received quality value of the reference signal (e.g., reference signal received quality (RSRQ) and/or a measured cell quality value ($Q_{qualmeas}$)), a cell selection Rx level value (Srxlev) determined based on a difference between the received power value of the reference signal and a first threshold (e.g., a minimum required Rx level in the cell ($Q_{rxlevmin}$)), and a cell selection quality value (e.g., Squal) determined based on a difference the received quality value of the reference signal and a second threshold (e.g., a minimum required quality level in the cell ($Q_{qualmin}$)).

According to an embodiment of the present disclosure, the first received power-related information may include at least one of Srxlev and Squal defined as follows:

$$Srxlev = Q_{rxlevmeas} - (Q_{rxlevmin} + Q_{rxlevminoffset}) - P\text{compensation} - Q\text{offset}_{temp}$$

$$Squal = Q_{qualmeas} - (Q_{qualmin} + Q_{qualminoffset}) - Q\text{offset}_{temp}$$

(where, Srxlev is the cell selection Rx level value (dB), $Q_{rxlevmeas}$ is the measured cell Rx level value (corresponding to the RSRP), $Q_{rxlevmin}$ is the minimum required Rx level in the cell(dBm), $Q_{rxlevminoffset}$ is an offset for $Q_{rxlevmin}$ considered as a result of periodic discovery for a higher-priority public land mobile network (PLMN) while in normal connection with a visiting PLMN, Pcompensation is max($P_{EMAX} - P_{PowerClass}$, 0)(dB), $P_{EMAX}$ is the maximum Tx power level value (dBm) available when the user equipment (UE) performs transmission on uplink in the cell, $P_{PowerClass}$ is the maximum RF output power (dBm) of the UE as per power class, Qoffset$_{temp}$ is the offset (dB) temporarily applied to the cell, Squal is the cell selection quality value (dB), $Q_{qualmeas}$ is the measured cell quality value (corresponding to the RSRQ), and $Q_{qualmin}$ is the minimum required quality level in the cell).

For example, the UE may correspond to the electronic device.

According to an embodiment of the present disclosure, the first received power-related information may be produced based on a RSRP corresponding to a value obtained by linearly averaging the received power of resource elements including a cell-specific reference signal in a measured bandwidth and/or a RSRQ defined by N*RSRP/RSSI (where RSSI is a receiver signal strength indicator and corresponds to the total received power of resource elements in the measured bandwidth, and N corresponds to the number of resource blocks for which the RSSI is measured).

For example, each resource block may include a plurality of resource elements.

According to an embodiment of the present disclosure, the electronic device may be configured to receive at least one sync signal (e.g., a primary synchronization channel (P-SCH) or primary synchronization signal, or a secondary synchronization channel (S-SCH) or secondary synchronization signal) from the first cell and obtain a cell ID of the first cell using information included in the at least one sync signal (e.g., a cell ID index included in the P-SCH or cell ID group included in the S-SCH) before operation 910.

For example, the cell ID of the first cell may be obtained as follows:

Cell ID=Cell ID Group*3+Cell ID index

In operation 920, the electronic device may determine whether the first received power-related information meets a predetermined first condition.

When the first condition is met, the electronic device may automatically perform operation 930, and if not, the electronic device may periodically or aperiodically repeat operations 910 and 920.

According to an embodiment of the present disclosure, when the first condition is not met, the electronic device may perform operations 910 and 920 on a reference signal received from a second cell of the first network which is different from the first cell through the first antenna. For example, unless the first condition is met, the electronic device may obtain (or produce) third received power-related information about the reference signal received from the second cell through the first antenna and may determine whether the third received power-related information meets the first condition.

According to an embodiment of the present disclosure, the first condition may include a condition where at least one received power-related value contained in the first received power-related information is not less than (or over)/not more than (or below) at least one preset threshold.

According to an embodiment of the present disclosure, the first condition may include a condition where the received power-related value contained in the first received power-related information is not less than (or over)/not more than (or below) a preset third threshold.

According to an embodiment of the present disclosure, the first received power-related information may include at least one of a cell selection Rx value and a cell selection quality value. The cell selection Rx value may be determined based on a difference between the received power value of the reference signal and the third threshold, and the cell selection quality value may be determined based on a difference between the received quality value of the reference signal and the second threshold. The first condition may include a condition where at least one of the cell selection Rx value and the cell selection quality value is larger than a preset threshold (e.g., 0).

According to an embodiment of the present disclosure, the first condition may be defined as follows:

$Srxlev>0$ AND $Squal>0$

According to an embodiment of the present disclosure, the first condition may include a condition where at least one received power-related value contained in the first received power-related information is not less than (or over)/not more than (or below) a received power-related value for a serving cell or second cell.

According to an embodiment of the present disclosure, the first received power-related information may include a RSRP and/or RSRQ. The electronic device may compare a RSRP and/or RSRQ for the first cell with at least one RSRP and/or RSRQ received from the serving cell (e.g., the second cell), and when the RSRP and/or RSRQ for the first cell is not less than (or over)/not more than (or below) the threshold, the electronic device may determine that the first condition is met.

In operation 930, when the first received power-related information meets the first condition, the electronic device may make a connection with the first cell or transmit at least a portion of the first received power-related information to the first cell or second cell.

According to an embodiment of the present disclosure, the electronic device, when the first condition is met, may send a random access preamble to the first cell for connection with the first cell and may receive a random access response message including link allocation information (e.g., an uplink (UL) grant) from the first cell.

For example, the random access preamble may include an ID, and the random access response message may include at least one of the ID, the uplink grant, a temporary C-radio network temporary identity (C-RNTI), and a time alignment command (TAC).

According to an embodiment of the present disclosure, after receiving the random access response message, the electronic device may send a radio resource control (RRC) connection request message to the first cell.

According to an embodiment of the present disclosure, the electronic device may receive a contention resolution message from the first cell in response to the RRC connection request message. For example, the RRC connection request message may include an ID (e.g., the temporary C-RNTI or cell ID), and the contention resolution message may include the ID.

According to an embodiment of the present disclosure, the electronic device may receive information regarding the first cell (e.g., a mobilityControlInfo including at least one of the frequency of the first cell included in a RRC connection reconfiguration message, channel configuration information, random access channel (RACH) procedure information, and/or the like) from the second cell and connect to the first cell using the information regarding the first cell.

According to an embodiment of the present disclosure, after receiving the information regarding the first cell from the second cell, the electronic device may send a random access preamble to the first cell and receive a random access response message including link allocation information from the first cell.

According to an embodiment of the present disclosure, unless the first condition is met, the electronic device may select any cell (e.g., the first cell or second cell) from among discovered cells or a cell with the highest received power-related value (e.g., received power value, received quality value, cell selection received value or cell selection quality value) and connect with the selected cell.

According to an embodiment of the present disclosure, unless the first condition is met, the electronic device may connect with the second network different from the first network or a third cell of the second network.

For example, the first network may include a LTE network, an IMS, or its similar network.

For example, the second network may include a universal terrestrial radio access network (UTRAN), global system for mobile communications (GSM)/enhanced data rates for GSM evolution (EDGE), GSM/EDGE radio access network (GERAN), CDMA2000, CDMA 1×, or its similar network. The second network may be called as a circuit switched (CS) network, 3rd generation partnership project (3GPP)/3GPP 2 CS network, or legacy network. Further, the second network may include a time division synchronous CDMA (TD-SCDMA) network which may typically be categorized as a 3G network.

For example, the second network may include at least one network entity, such as a base-station transceiver subsystem (BTS) (or NodeB (NB)) or mobile switching center (MSC).

The BTS may play a role to make a connection between the CS network exchanger and the electronic device and may perform such functions as radio access to the electronic device, maintaining synchronization, or allocation/release of call channels.

The MCS may function to connect the public switched telephone network with the mobile communication network and may be located at the center of the mobile communication network to establish a voice or non-voice call pathway in conjunction with the BTS or home location register (HLR) and carry out operation and maintenance of the exchanger.

Figure 10:
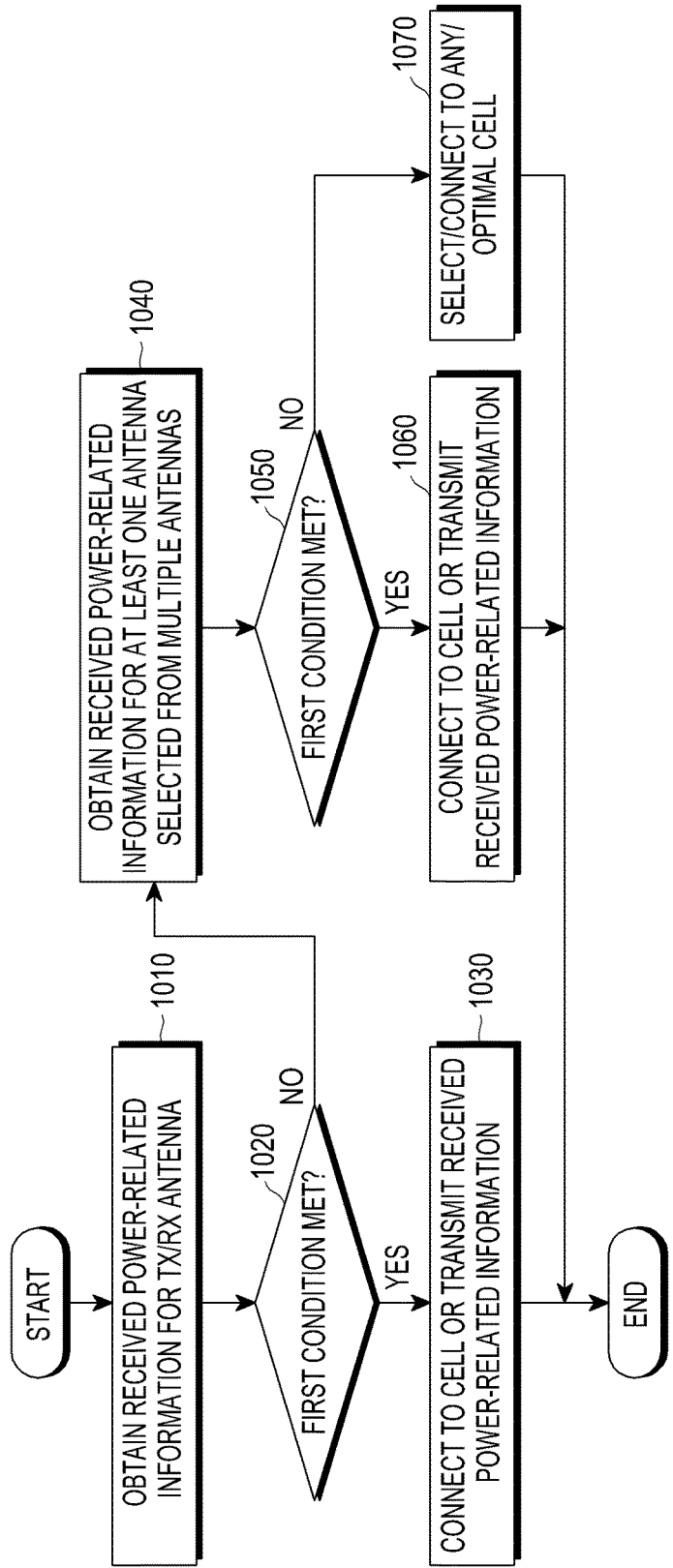
FIG. 10 is a flowchart illustrating an example cell selection method by an electronic device according to an example embodiment of the present disclosure.

FIG. 10 is a flowchart illustrating an example cell selection method by an electronic device according to an example embodiment of the present disclosure. An operation method by the electronic device may include operations 1010 to 1070. The operation method by the electronic device may be performed by at least any one of the electronic device (e.g., the electronic device 101, 201, 401, 601, or 801), a processor (e.g., the processor 120, 210, or 810) of the electronic device, and a communication device (e.g., the communication interface 170, the communication module 220 or 820, or the cellular module 221) of the electronic device.

Since operations 1010 to 1030 may correspond to operations 910 and 930 of FIG. 9, a description thereof is not repeated here.

In operation 1010, the electronic device may obtain received power-related information about a Tx/Rx antenna.

For example, the electronic device may include a plurality of antennas (e.g., the RF module 229, a main antenna device 510, Tx/Rx antennas 512, 514, 782, 784, and 821, a diversity antenna device 520, Rx antennas 522, 524, 792, 794, 822, and 823, and/or the like), and the plurality of antennas may include a first antenna (i.e., a Tx/Rx antenna) (e.g., the RF module 229, the main antenna device 510, the Tx/Rx antennas 512, 514, 782, 784, and 821, and/or the like) configured to transmit and/or receive signals, and a second antenna (e.g., the RF module 229, the diversity antenna device 520, the Rx antennas 522, 524, 792, 794, 822, and 823, and/or the like) configured to only receive signals.

For example, the electronic device may first select, from among the plurality of antennas, the first antenna (i.e., a Tx/Rx antenna) (e.g., the RF module 229, the main antenna device 510, the Tx/Rx antennas 512, 514, 782, 784, and 821, and/or the like) configured to transmit and/or receive signals and may obtain (or produce) first received power-related information about a reference signal received from a first cell (e.g., the first cell 831) of a first network through the first antenna first selected.

According to an embodiment of the present disclosure, the first received power-related information may include at least one of a received power value of the reference signal (e.g., reference signal received power (RSRP) and/or a measured cell Rx level value (Qrxlevmeas)), a received quality value of the reference signal (e.g., reference signal received quality (RSRQ) and/or a measured cell quality value (Qqualmeas)), a cell selection Rx level value (Srxlev) determined based on a difference between the received power value of the reference signal and a first threshold (e.g., a minimum required Rx level in the cell (Qrxlevmin)), and a cell selection quality value (e.g., Squal) determined based on a difference the received quality value of the reference signal and a second threshold (e.g., a minimum required quality level in the cell ($Q_{qualmin}$)).

In operation 1020, the electronic device may determine whether the first received power-related information meets a predetermined first condition.

When the first condition is met, the electronic device may automatically perform operation 1030, and if not, the electronic device may automatically perform operation 1040.

According to an embodiment of the present disclosure, the first condition may include a condition where at least one received power-related value contained in the first received power-related information is not less than (or over)/not more than (or below) at least one preset threshold.

In operation 1030, when the first received power-related information meets the first condition, the electronic device may make a connection with the first cell or transmit at least a portion of the first received power-related information to the first cell or second cell.

In operation 1040, when the first condition is not met, the electronic device may obtain received power-related information about reference signals received from the first cell through at least one antenna selected from among the plurality of antennas.

For example, the electronic device may obtain (or produce) second received power-related information for a corresponding reference signal using at least one value (e.g., a maximum value) of the received power values (e.g., RSRP, $Q_{rxlevmeas}$) and/or received quality values (e.g., RSRQ, $Q_{qualmeas}$) for the reference signals received from the first cell through the plurality of antennas or a value (e.g., a mean value) obtained by combining the received power values and/or received quality values.

For example, the electronic device may obtain (or produce) a first received power value and/or first received quality value for a first antenna (e.g., the first antenna 821) configured to transmit and/or receive signals, a second received power value and/or second received quality value for a second antenna (e.g., the second antenna 822) configured to only receive signals, and a third received power value and/or third received quality value for a third antenna (e.g., the third antenna 822) configured to only receive signals. The electronic device may select a first maximum value from among the first to third received power values and/or a second maximum value from among the first to third received quality values and may obtain the second received power-related information including the first maximum value and/or the second maximum value or a cell selection Rx value and/or cell selection quality value obtained using the first maximum value and/or the second maximum value.

According to an embodiment of the present disclosure, the electronic device may select the first maximum value from among the second and third received power values and/or the second maximum value from among the second and third received power values, excluding the first received power value and the first received quality value.

According to an embodiment of the present disclosure, the electronic device may select a value (e.g., a mean value) obtained using at least two of the first to third received power values.

In operation 1050, the electronic device may determine whether the second received power-related information meets the first condition.

When the first condition is met, the electronic device may automatically perform operation 1060, and if not, the electronic device may perform operation 1070.

In operation 1060, when the first received power-related information meets the first condition, the electronic device may make a connection with the first cell or transmit at least a portion of the first received power-related information to the first cell or second cell.

In operation 1070, unless the first condition is met, the electronic device may select any cell (e.g., the first cell or second cell) from among discovered cells or a cell with the highest received power-related value (e.g., received power value, received quality value, cell selection received value or cell selection quality value) or cell with a received power-related value not less than a threshold and connect with the selected cell.

According to an embodiment of the present disclosure, unless the first condition is met, the electronic device may connect with the second network different from the first network or a third cell of the second network.

For example, the first network may include a LTE network, an IMS, or its similar network. For example, the second network may include a UTRAN, GSM/EDGE radio access network (GERAN), CDMA2000, CDMA 1×, or its similar network.

Figure 11:
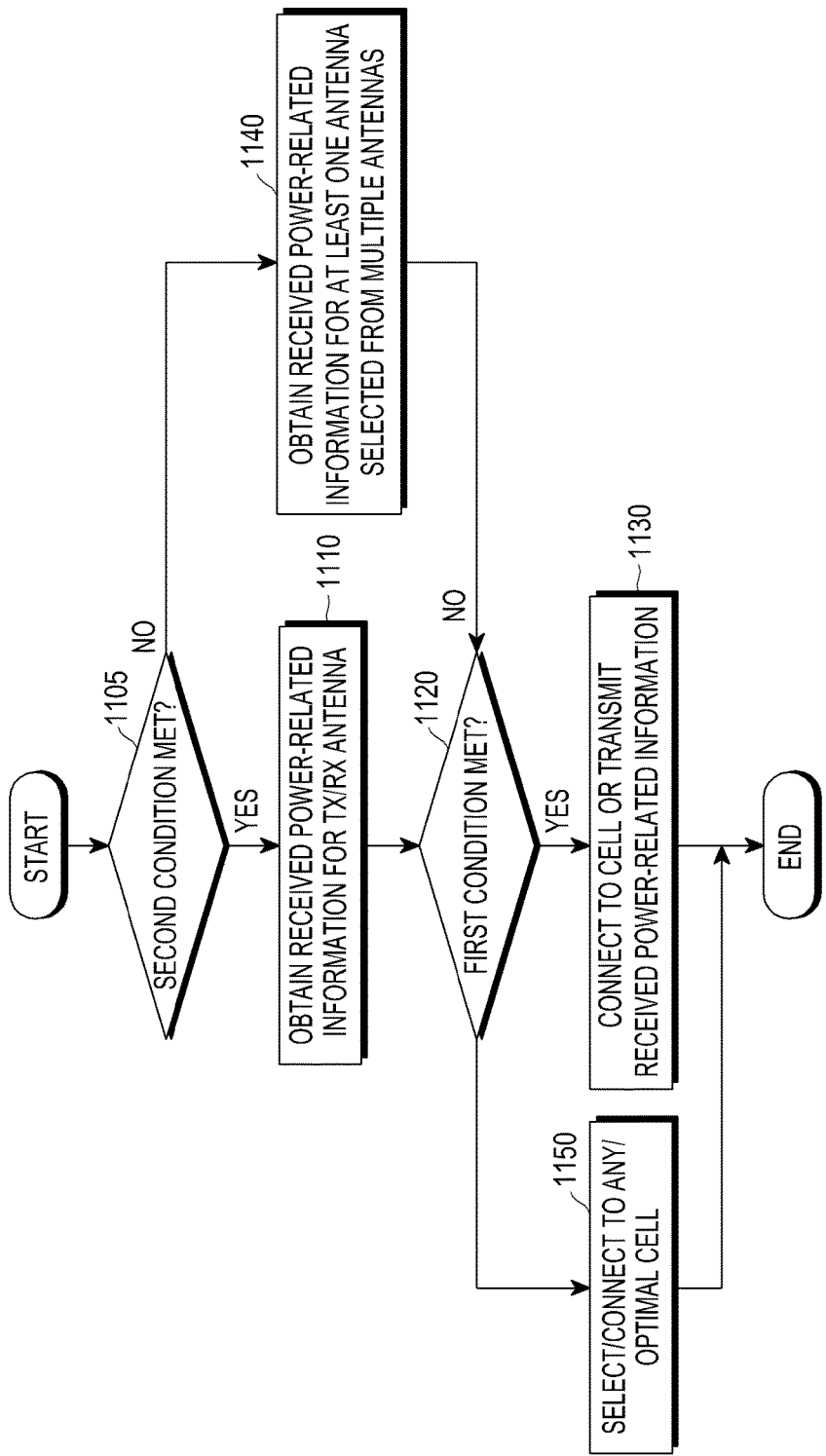
FIG. 11 is a flowchart illustrating an example cell selection method by an electronic device according to an example embodiment of the present disclosure.

FIG. 11 is a flowchart illustrating an example cell selection method by an electronic device according to an example embodiment of the present disclosure. An operation method by the electronic device may include operations 1105 to 1150. The operation method by the electronic device may be performed by at least any one of the electronic device (e.g., the electronic device 101, 201, 401, 601, or 801), a processor (e.g., the processor 120, 210, or 810) of the electronic device, and a communication device (e.g., the communication interface 170, the communication module 220 or 820, or the cellular module 221) of the electronic device.

Since operations 1110 to 1130 may correspond to operations 910 and 930 of FIG. 9, a description thereof is not repeated here.

In operation 1105, the electronic device may determine whether a preset second condition is met.

When the second condition is met, the electronic device may automatically perform operation 1110, and if not, the electronic device may automatically perform operation 1140.

For example, the electronic device may include a plurality of antennas (e.g., the RF module 229, a main antenna device 510, Tx/Rx antennas 512, 514, 782, 784, and 821, a diversity antenna device 520, Rx antennas 522, 524, 792, 794, 822, and 823, and/or the like), and the plurality of antennas may include a first antenna (i.e., a Tx/Rx antenna) (e.g., the RF module 229, the main antenna device 510, the Tx/Rx antennas 512, 514, 782, 784, and 821, and/or the like) configured to transmit and/or receive signals, and a second antenna (e.g., the RF module 229, the diversity antenna device 520, the Rx antennas 522, 524, 792, 794, 822, and 823, and/or the like) configured to only receive signals.

According to an embodiment of the present disclosure, the second condition may include at least one of when the user's grip (i.e., when the user firmly holds the electronic device) is detected or not detected through a sensor (e.g., the grip sensor 240F) of the electronic device, when a difference between a first received power-related value (e.g., a received power value, received quality value, cell selection Rx value, or cell selection quality value) for the reference signal received through the first antenna and a second received power-related value for the reference signal received through the second antenna is not more than (or below) or not less than (or over) a preset threshold (e.g., 5 dB), when the first and/or second received power-related value is varied to be not less or not more than a threshold, when the state where the first and/or second received power-related value is varied to be not less or more than the threshold lasts a preset threshold time or more or less, when the state of the first and/or second received power-related value is the same or similar to a preset state (or belongs to a preset state range), and when the position/state of the electronic device is the same or similar to a preset position/state (or belongs to a preset position/state range).

According to an embodiment of the present disclosure, the second condition may include at least one of when the user's grip is detected and when a difference between a received power-related value for the reference signal received through the first antenna and a received power-related value for the reference signal received through the second antenna is not less than a preset threshold (e.g., 5 dB).

In operation 1110, the electronic device may obtain received power-related information about a Tx/Rx antenna.

For example, the electronic device may first select, from among the plurality of antennas, the first antenna (i.e., a Tx/Rx antenna) (e.g., the RF module 229, the main antenna device 510, the Tx/Rx antennas 512, 514, 782, 784, and 821, and/or the like) configured to transmit and/or receive signals and may obtain (or produce) first received power-related information about a reference signal received from a first cell (e.g., the first cell 831) of a first network through the first antenna first selected.

According to an embodiment of the present disclosure, the first received power-related information may include at least one of a received power value of the reference signal (e.g., reference signal received power (RSRP) and/or a measured cell Rx level value (Qrxlevmeas)), a received quality value of the reference signal (e.g., reference signal received quality (RSRQ) and/or a measured cell quality value (Qqualmeas)), a cell selection Rx level value (Srxlev) determined based on a difference between the received power value of the reference signal and a first threshold (e.g., a minimum required Rx level in the cell (Qrxlevmin)), and a cell selection quality value (e.g., Squal) determined based on a difference the received quality value of the reference signal and a second threshold (e.g., a minimum required quality level in the cell ($Q_{qualmin}$)).

In operation 1120, the electronic device may determine whether the first received power-related information meets a predetermined first condition.

When the first condition is met, the electronic device may automatically perform operation 1130, and if not, the electronic device may automatically perform operation 1150.

According to an embodiment of the present disclosure, the first condition may include a condition where at least one received power-related value contained in the first received power-related information is not less than (or over)/not more than (or below) at least one preset threshold.

In operation 1130, when the first received power-related information meets the first condition, the electronic device may make a connection with the first cell or transmit at least a portion of the first received power-related information to the first cell or second cell.

In operation 1140, when the second condition is not met, the electronic device may obtain received power-related information about reference signals received from the first cell through at least one antenna selected from among the plurality of antennas.

For example, the electronic device may obtain (or produce) second received power-related information for a corresponding reference signal using at least one value (e.g., a maximum value) of the received power values (e.g., RSRP, $Q_{rxlevmeas}$) and/or received quality values (e.g., RSRQ, $Q_{qualmeas}$) for the reference signals received from the first cell through the plurality of antennas or a value (e.g., a mean value) obtained by combining the received power values and/or received quality values.

In operation 1150, unless the first condition is met, the electronic device may select any cell (e.g., the first cell or second cell) from among discovered cells or a cell with the highest received power-related value (e.g., received power value, received quality value, cell selection received value or cell selection quality value) and connect with the selected cell.

According to an embodiment of the present disclosure, unless the first condition is met, the electronic device may connect with the second network different from the first network or a third cell of the second network.

For example, the first network may include a LTE network, an IMS, or its similar network. For example, the second network may include a UTRAN, GSM/EDGE radio access network (GERAN), CDMA2000, CDMA 1x, or its similar network.

Figure 12:
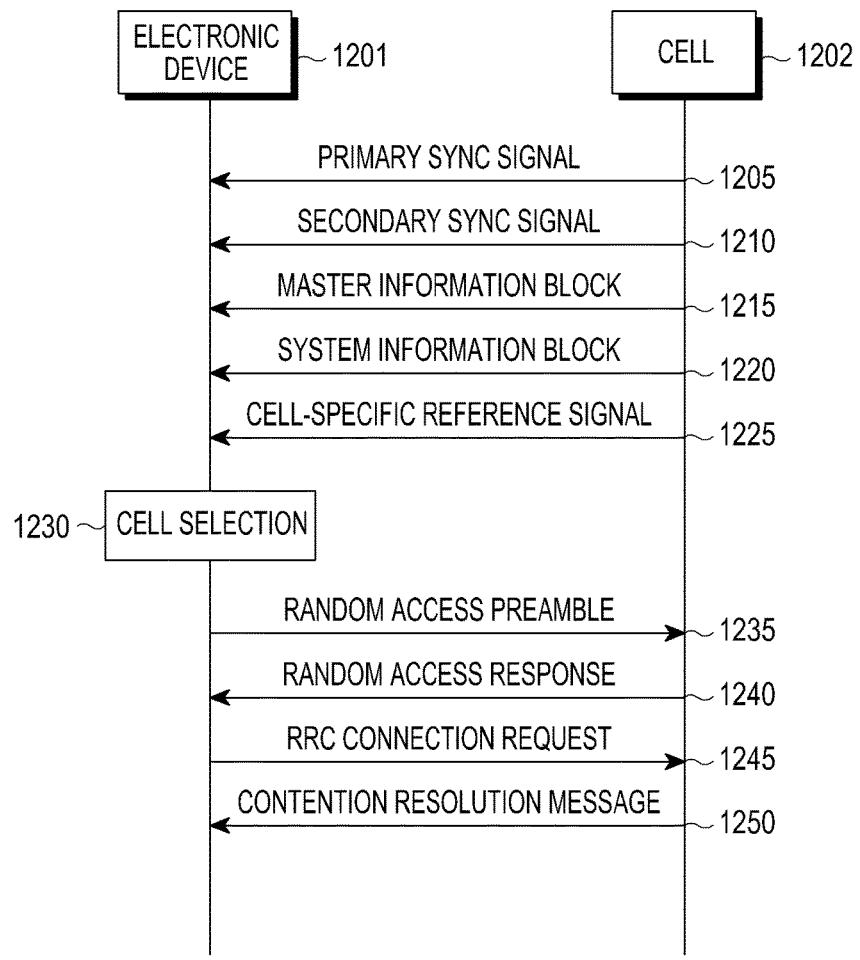
FIG. 12 is a signal flow diagram illustrating an example communication method by a communication system according to an example embodiment of the present disclosure.

FIG. 12 is a signal flow diagram illustrating an example communication method by a communication system according to an example embodiment of the present disclosure. The communication system may include an electronic device 1201 (e.g., the electronic device 101, 201, 401, 601, or 801) and a cell 1202 of a first network providing packet data (or Internet protocol)-based call services.

For example, the first network may include at least one of a LTE network and an IMS. The IMS may be included in the LTE network. The first network may provide an IMS-based voice over LTE (VoLTE) call service in a packet switched (PS) manner. For example, the LTE network may be a long-term evolution-advanced (LTE-A) network. For example, LTE network may be used in the same term as enhanced universal mobile telecommunications system terrestrial radio access network (E-UTRAN).

For example, the LTE network may include at least one network entity, such as a cell or base station (e.g., an enhanced Node B (eNB)), a mobility management entity (MME), a serving gateway (S-GW), or a packet data network (PDN) gateway (P-GW).

For example, the cell 1202 may be a radio access network (RAN) node and may correspond to a radio network controller (RNC) in the UTRAN system or a base station controller (BSC) in the GSM/EDGE radio access network (GERAN) system. The cell 1202 may be connected with the electronic device 1201 via a radio channel and may perform a similar role as the legacy RNC/BSC.

The MME is an entity in charge of various control functions. One MME may be connected with multiple base stations.

The S-GW is an apparatus providing data bearers and may generate or remove a data bearer under the control of the MME.

The P-GW may provide connectivity with the S-GW or external PDN.

The IMS may include a proxy-call session control function (CSCF) enhanced for WebRTC (eP-CSCF) forwarding received messages or data to an interrogating-CSCF (I-CSCF) or serving-CSCF (S-CSCF), an I-CSCF routing received messages or data to an S-CSCF, an S-CSCF registering the electronic device 1201, routing messages received from the PDN or 3GPP/3GPP2 CS network to the eP-CSCF (or the electronic device 1201), or routing messages received from the eP-CSCF (or the electronic device 1201) to the PDN or 3GPP/3GPP2 CS network, and an IMS access gateway enhanced for WebRTC (eIMS-AGW) performing a transcoding function.

The operations by the electronic device 1201 may be performed by at least any one of the electronic device 1201, a processor (e.g., the processor 120, 210, or 810) of the electronic device 1201, and a communication device (e.g., the communication interface 170, the communication module 220 or 820, or the cellular module 221) of the electronic device 1201.

In operation 1205, the electronic device 1201 may receive a primary synchronization signal (or primary synchronization channel (P-SCH)) from the cell 1202.

For example, the electronic device 1201 may scan frequency bands where the cell may be discovered in order to receive the primary synchronization signal from at least one cell.

The electronic device 1201 may obtain information, such as a cell ID index, subframe timing, or a cyclic prefix (CP) length, from the primary synchronization signal. For example, the primary synchronization signal may correspond to the last orthogonal frequency division multiplexing (OFDM) symbol of the first time slot of the first subframe in the radio frame transmitted from the cell 1202.

In operation 1210, the electronic device 1201 may receive a secondary synchronization signal (or secondary synchronization channel (S-SCH)) from the cell 1202.

The electronic device 1201 may obtain information, such as a cell ID group or frame timing, from the secondary synchronization signal.

For example, the electronic device 1201 may be configured to obtain the cell ID of the cell 1202 using the cell ID index and cell ID group.

For example, the cell ID of the first cell may be obtained as follows:

Cell ID=Cell ID Group*3+Cell ID index

In operation 1215, the electronic device 1201 may receive a master information block from the cell 1202. The electronic device 1202 may obtain information, such as cell bandwidth or system frame number, from the master information block.

In operation 1220, the electronic device 1201 may receive system information blocks (SIBs) from the cell 1202 using the information of the master information block. The electronic device 1201 may obtain information necessary for cell selection, cell reselection, or cell connection from the system information blocks. For example, the system information blocks may include information, such as minimum required Rx level in the cell ($Q_{rxlevmin}$) or minimum required quality level in the cell ($Q_{qualmin}$).

In operation 1225, the electronic device 1201 may receive a reference signal from the cell 1202.

For example, the reference signal may correspond to the symbol (symbol1) or resource element including the reference signal in the radio frame received from the cell 1202.

In operation 1230, the electronic device 1201 may perform a cell selection procedure.

For example, the electronic device 1201 may obtain received power-related information regarding the reference signal received through at least one of the plurality of antennas (e.g., the RF module 229, main antenna device 510, Tx/Rx antennas 512, 514, 782, 784, and 821, the diversity antenna device 520, the Rx antennas 522, 524, 792, 794, 822, and 823, and/or the like). For example, the electronic device 1201 may first select the first antenna (i.e., a Tx/Rx antenna) (e.g., the RF module 229) configured to transmit and/or receive signals, the main antenna device 510.

For example, the electronic device 1201 may perform a cell selection operation as per operations 910 and 920 of FIG. 9, operations 1010 and 1020 or operations 1040 and 1050, or operation 1070 of FIG. 10, or operations 1105 to 1120, 1140, and 1150 of FIG. 11.

In operation 1235, the electronic device 1201 may transmit a random access preamble to the cell 1202. For example, the electronic device 1201 may generate the random access preamble using the information obtained from the system information blocks. For example, the random access preamble to be sent to the cell 1202 may be selected from a group of random access preambles indicated by the system information blocks.

In operation 1240, the electronic device 1201 may receive a random access response message from the cell 1202.

For example, the random access preamble may include an ID, and the random access response message may include at least one of the ID, the uplink grant, a temporary C-radio network temporary identity (C-RNTI), and a time alignment command (TAC).

In operation 1245, the electronic device 1201 may transmit a radio resource control (RRC) connection request message to the cell 1202.

In operation 1250, the electronic device 1201 may receive a contention resolution message from the cell 1202 in response to the RRC connection request message.

For example, the RRC connection request message may include an ID (e.g., the temporary C-RNTI or cell ID), and the contention resolution message may include the ID.

For example, by receiving the random access response message or contention resolution message, the connection procedure between the electronic device 1201 and the cell 1202 may be complete.

Figure 13:
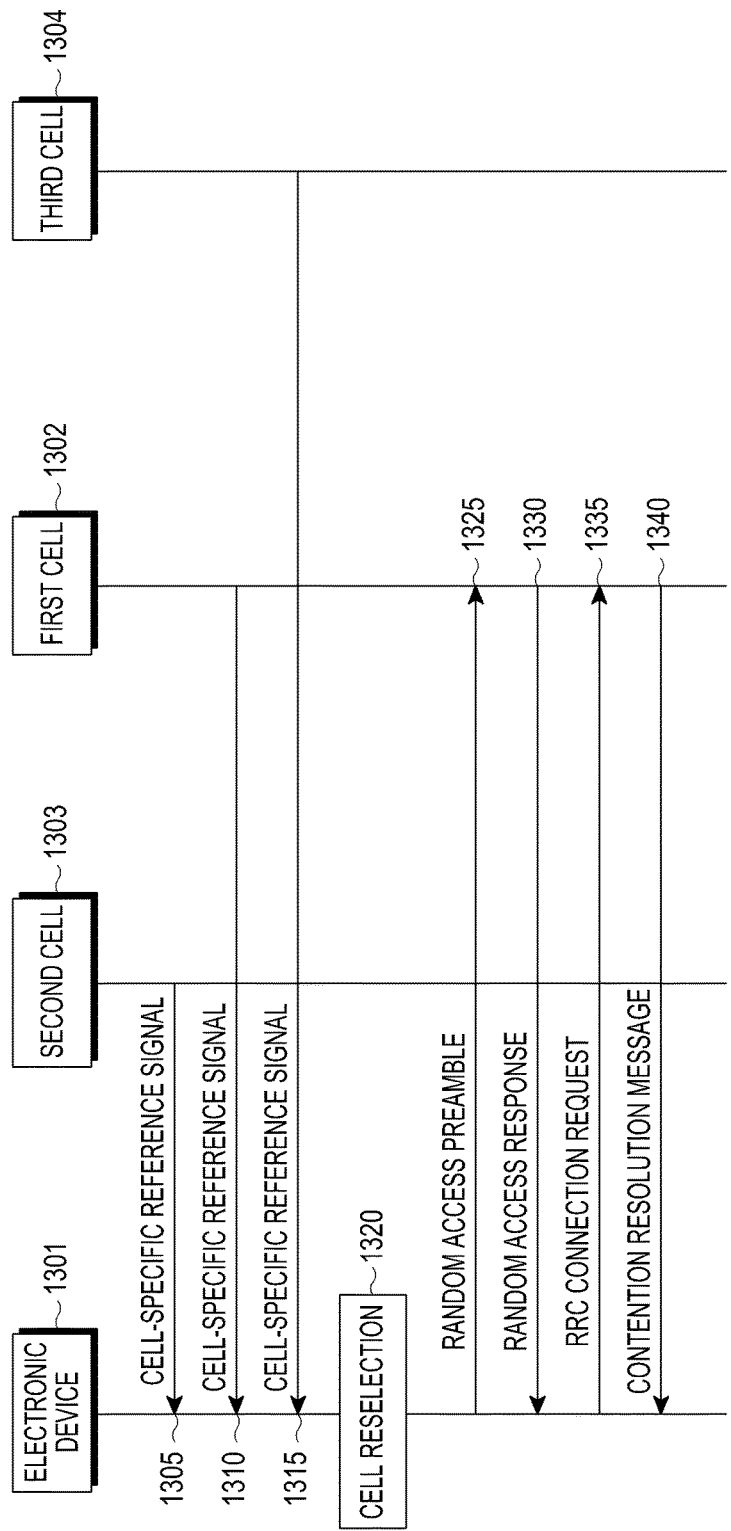
FIG. 13 is a signal flow diagram illustrating a communication method by a communication system according to an example embodiment of the present disclosure.

FIG. 13 is a signal flow diagram illustrating an example communication method by a communication system according to an example embodiment of the present disclosure.

The communication system may include an electronic device 1301 (e.g., the electronic device 101, 201, 401, 601, or 801) and a first cell 1302, second cell 1303, and third cell 1304 of a first network providing packet data (or Internet protocol)-based call services.

The operations by the electronic device 1301 may be performed by at least any one of the electronic device 1301, a processor (e.g., the processor 120, 210, or 810) of the electronic device 1301, and a communication device (e.g., the communication interface 170, the communication module 220 or 820, or the cellular module 221) of the electronic device 1301.

Initially, the electronic device 1301, after connected to the second cell 1303 (i.e., serving cell), may stay in an idle state.

In operation 1305, the electronic device 1301 may receive a second reference signal from the second cell 1303.

In operation 1310, the electronic device 1301 may receive a first reference signal from the first cell 1302.

In operation 1315, the electronic device 1301 may receive a third reference signal from the third cell 1304.

For example, the electronic device 1301 may include a plurality of antennas (e.g., the RF module 229, a main antenna device 510, Tx/Rx antennas 512, 514, 782, 784, and 821, a diversity antenna device 520, Rx antennas 522, 524, 792, 794, 822, and 823, and/or the like), and the plurality of antennas may include a first antenna (i.e., a Tx/Rx antenna) (e.g., the RF module 229, the main antenna device 510, the Tx/Rx antennas 512, 514, 782, 784, and 821, and/or the like) configured to transmit and/or receive signals, and a second antenna (e.g., the RF module 229, the diversity antenna device 520, the Rx antennas 522, 524, 792, 794, 822, and 823, and/or the like) configured to only receive signals.

For example, each of the reference signals may correspond to the symbol (symbol1) or resource element including each reference signal in the radio frame received from a corresponding cell 1302, 1303, or 1304.

In operation 1320, the electronic device 1301 may perform a cell reselection procedure.

According to an embodiment of the present disclosure, the electronic device 1301 may perform the cell reselection procedure when a preset cell reselection condition is met. For example, the electronic device 1301 may perform the cell reselection procedure when second received power-related information (e.g., a received power value, received quality value, cell selection Rx value, or cell selection quality value) for a second reference signal received from the second cell 1303 meets the cell reselection condition (or at least one preset threshold or more (or more than the threshold) or the threshold or less (or less than the threshold).

According to an embodiment of the present disclosure, the electronic device 1301 may obtain (or produce) second received power-related information for the second reference signal using at least one value (e.g., a maximum value) of the received power values (e.g., RSRP, $Q_{rxlevmeas}$) and/or received quality values (e.g., RSRQ, $Q_{qualmeas}$) for the second reference signals received from the second cell 1303 through the plurality of antennas or a value (e.g., a mean value) obtained by combining the received power values and/or received quality values.

According to an embodiment of the present disclosure, the electronic device 1301 may perform the cell reselection procedure when the second cell selection Rx value (e.g., Srxlev) and/or the second cell selection quality value (e.g., Squal) for the second cell 1303 is at least one preset threshold or less/more. For example, the electronic device 1301 may perform the cell reselection procedure when the second cell selection Rx value is a preset first threshold or less (or below the first threshold) and/or the second cell selection quality value is a preset second threshold or less (or below the second threshold).

According to an embodiment of the present disclosure, the electronic device 1301 may obtain received power-related information about the first, second, and/or third reference signal received through at least one of the plurality of antennas. For example, the electronic device 1301 may first select the first antenna (i.e., a Tx/Rx antenna) (e.g., the RF module 229) configured to transmit and/or receive signals, the main antenna device 510.

For example, the electronic device 1301 may perform a cell reselection operation as per operations 910 and 920 of FIG. 9, operations 1010 and 1020 or operations 1040 and 1050, or operation 1070 of FIG. 10, or operations 1105 to 1120, 1140, and 1150 of FIG. 11.

According to an embodiment of the present disclosure, the electronic device 1301 may perform the cell reselection operation on the first cell 1302 and the third cell 1304, excluding the second cell 1303.

In operation 1325, the electronic device 1301 may transmit a random access preamble to the first cell 1302 selected through the cell reselection procedure.

In operation 1330, the electronic device 1301 may receive a random access response message from the first cell 1302.

In operation 1335, the electronic device 1301 may transmit a radio resource control (RRC) connection request message to the first cell 1302.

In operation 1340, the electronic device 1301 may receive a contention resolution message from the first cell 1302 in response to the RRC connection request message.

For example, by receiving the random access response message or contention resolution message, the connection procedure between the electronic device 1301 and the first cell 1302 may be complete.

Figure 14:
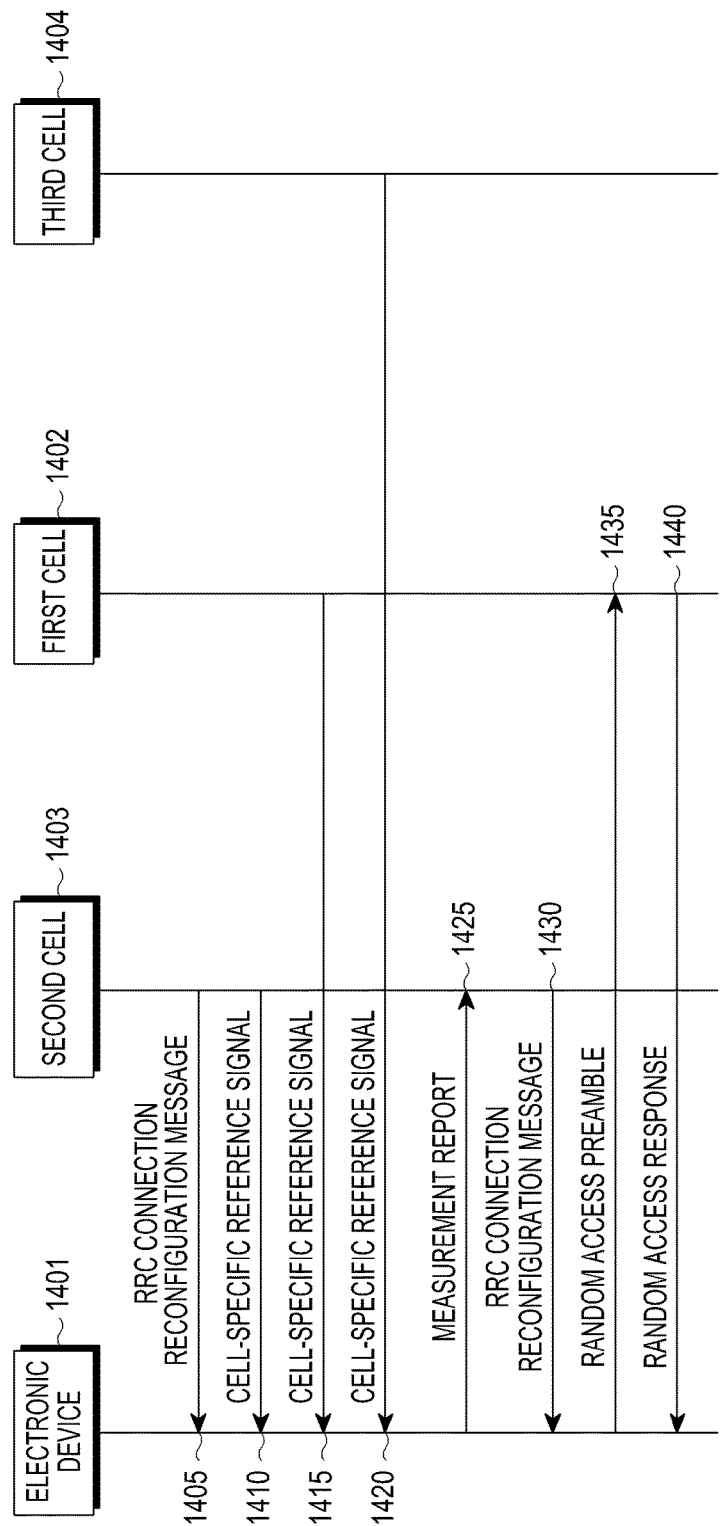
FIG. 14 is a signal flow diagram illustrating a communication method by a communication system according to an example embodiment of the present disclosure.

FIG. 14 is a signal flow diagram illustrating an example communication method by a communication system according to an example embodiment of the present disclosure. The communication system may include an electronic device 1401 (e.g., the electronic device 101, 201, 401, 601, or 801) and a first cell 1402, second cell 1403, and third cell 1404 of a first network providing packet data (or Internet protocol)-based call services.

The operations by the electronic device 1401 may be performed by at least any one of the electronic device 1401, a processor (e.g., the processor 120, 210, or 810) of the electronic device 1401, and a communication device (e.g., the communication interface 170, the communication module 220 or 820, or the cellular module 221) of the electronic device 1401.

Initially, the electronic device 1401 may stay connected with the second cell 1403 (i.e., the serving cell).

In operation 1405, the electronic device 1401 may receive a RRC connection reconfiguration message from the second cell 1403. The RRC connection reconfiguration message may include information (e.g., measConfig) necessary for measurement report. For example, the RRC connection reconfiguration message may include a measurement report condition, such as RSRP and/or RSRQ threshold.

In operation 1410, the electronic device 1401 may receive a second reference signal from the second cell 1403.

In operation 1415, the electronic device 1401 may receive a first reference signal from the first cell 1402.

In operation 1420, the electronic device 1401 may receive a third reference signal from the third cell 1404.

For example, the electronic device 1401 may include a plurality of antennas (e.g., the RF module 229, a main antenna device 510, Tx/Rx antennas 512, 514, 782, 784, and 821, a diversity antenna device 520, Rx antennas 522, 524, 792, 794, 822, and 823, and/or the like), and the plurality of antennas may include a first antenna (i.e., a Tx/Rx antenna) (e.g., the RF module 229, the main antenna device 510, the Tx/Rx antennas 512, 514, 782, 784, and 821, and/or the like) configured to transmit and/or receive signals, and a second antenna (e.g., the RF module 229, the diversity antenna device 520, the Rx antennas 522, 524, 792, 794, 822, and 823, and/or the like) configured to only receive signals.

For example, each of the reference signals may correspond to the symbol (symbol1) or resource element including each reference signal in the radio frame received from a corresponding cell 1402, 1403, or 1404.

In operation 1425, the electronic device 1401 may transmit a measurement report message for a cell meeting the measurement report condition to the second cell 1403.

For example, the electronic device 1401 may first select the first antenna (i.e., the Tx/Rx antenna) configured to transmit and/or receive signals from among the plurality of antennas and may obtain (or produce) first, second, and third received power-related information for the first, second, and third reference signal received through the first antenna first selected.

For example, each piece of the received power-related information may include a RSRP and/or RSRQ. The electronic device may compare a RSRP and/or RSRQ for each cell 1402, 1403, and 1404 with at least one RSRP and/or RSRQ received from the second cell 1403, and when the RSRP and/or RSRQ for each cell is not less than (or over)/not more than (or below) the threshold, the electronic device may determine that the measurement report condition is met.

For example, the measurement report message may include at least a portion (e.g., RSRP and/or RSRQ) of corresponding received power-related information.

In operation 1430, the electronic device 1401 may receive a RRC connection reconfiguration message from the second cell 1403. The RRC connection reconfiguration message may include information (e.g., mobilityControlInfo) necessary for a handover. For example, the RRC connection reconfiguration message may include at least one of the frequency, channel configuration information, and random access channel (RACH) procedure information of the first cell 1402 to which to hand over.

In operation 1435, the electronic device 1401 may transmit a random access preamble to the first cell 1402.

In operation 1440, the electronic device 1401 may receive a random access response message from the first cell 1402.

For example, by receiving the random access response message, the handover procedure of the electronic device 1401 to the first cell 1402 may be complete.

According to an embodiment of the present disclosure, a method for selecting a cell by an electronic device including a plurality of antennas comprises obtaining first received power-related information for a reference signal received from a first cell of a first network through a first antenna configured to transmit and/or receive signals among the plurality of antennas, determining whether the first received power-related information meets a preset first condition, and when the first received power-related information meets the first condition, forming a connection with the first cell or transmitting at least a portion of the first received power-related information to the first cell or a second cell of the first network.

According to an embodiment of the present disclosure, the plurality of antennas may include the first antenna configured to transmit and/or receive signals and a second antenna configured to only receive signals.

According to an embodiment of the present disclosure, the method may further comprise first obtaining received power-related information for a reference signal outputted from the first antenna among the plurality of antennas.

According to an embodiment of the present disclosure, the method may further comprise first obtaining received power-related information for a reference signal outputted from the first antenna among the plurality of antennas and/or determining whether the received power-related information meets the first condition.

According to an embodiment of the present disclosure, the method may further comprise, when the first condition is not met, obtaining second received power-related information for a corresponding reference signal using at least one value (e.g., a maximum value) or combined value (e.g., a mean value) of received power values or received quality values for reference signals received from the first cell through the plurality of antennas, determining whether the second received power-related information meets the first condition, and when the second received power-related information meets the first condition, forming a connection with the first cell or transmitting at least a portion of the second received power-related information to the first cell or the second cell.

According to an embodiment of the present disclosure, the plurality of antennas may include the first antenna configured to transmit and/or receive signals and a second antenna configured to only receive signals. The method may further comprise obtaining second received power-related information for the reference signal received from the first cell through the second antenna when the first condition is not met, determining whether the second received power-related information meets the first condition, and when the second received power-related information meets the first condition, forming a connection with the first cell or transmitting at least a portion of the second received power-related information to the first cell or the second cell.

According to an embodiment of the present disclosure, the method may further comprise obtaining third received power-related information for a reference signal received from the second cell through the first antenna when the first condition is not met, determining whether the third received power-related information meets the first condition, and when the third received power-related information meets the first condition, forming a connection with the second cell or transmitting at least a portion of the third received power-related information to the first cell or the second cell.

According to an embodiment of the present disclosure, the method may further comprise determining whether a preset second condition is met, and depending on whether the second condition is met, determining whether to first obtaining received power-related information for the reference signal outputted from the first antenna among the plurality of antennas and/or to determine whether the received power-related information meets the first condition.

According to an embodiment of the present disclosure, the plurality of antennas may include the first antenna configured to transmit and/or receive signals and a second antenna configured to only receive signals. The method may further comprise determining whether a preset second condition is met, and depending on whether the second condition is met, determining whether to first obtaining received power-related information for the reference signal outputted from the first antenna among the plurality of antennas and/or to determine whether the received power-related information meets the first condition. The second condition may include at least one of when a user's grip is detected through a sensor of the electronic device and when a difference between the received power-related value for the reference signal received through the first antenna and the received power-related value for the reference signal received through the second antenna is not more than a preset threshold or not less than the threshold.

According to an embodiment of the present disclosure, the method may further comprise determining whether a preset second condition is met. When the second condition is met, received power-related information may be obtained first for the reference signal outputted from the first antenna among the plurality of antennas, and/or whether the received power-related information meets the first condition may be determined.

According to an embodiment of the present disclosure, the method may further comprise determining whether a preset second condition is met and, when the first condition is not met, obtaining second received power-related information for a corresponding reference signal using at least one value (e.g., a maximum value) or combined value (e.g., a mean value) of received power values or received quality values for reference signals received from the first cell through the plurality of antennas, determining whether the second received power-related information meets the first condition, and when the second received power-related information meets the first condition, forming a connection with the first cell or transmitting at least a portion of the second received power-related information to the first cell or the second cell.

According to an embodiment of the present disclosure, the first received power-related information may include at least one of a received power value of the reference signal, a received quality value of the reference signal, a cell selection Rx value determined based on a difference between the received power value of the reference signal and a first threshold, and a cell selection quality value determined based on a difference between the received quality value of the reference signal and a second threshold.

According to an embodiment of the present disclosure, the first received power-related information may include at least one of a cell selection Rx value and a cell selection quality value. The cell selection Rx value may be determined based on a difference between the received power value of the reference signal and the third threshold, and the cell selection quality value may be determined based on a difference between the received quality value of the reference signal and the second threshold. The first condition may include a condition where at least one of the cell selection Rx value and the cell selection quality value is larger than a preset threshold.

According to an embodiment of the present disclosure, the first received power-related information may include at least one of Srxlev and Squal defined as follows:

$$Srxlev=Q_{rxlevmeas}-(Q_{rxlevmin}+Q_{rxlevminoffset})-Pcompensation-Qoffset_{temp}$$

$$Squal=Q_{qualmeas}-(Q_{qualmin}+Q_{qualminoffset})-Qoffset_{temp}$$

(where, Srxlev is the cell selection Rx level value (dB), Qrxlevmeas is the measured cell Rx level value (corresponding to the RSRP), Qrxlevmin is the minimum required Rx level in the cell(dBm), Qrxlevminoffset is an offset for Qrxlevmin considered as a result of periodic discovery for a higher-priority public land mobile network (PLMN) while in normal connection with a visiting PLMN, Pcompensation is max(PEMAX−PPowerClass, 0)(dB), PEMAX is the maximum Tx power level value (dBm) available when the user equipment (UE) performs transmission on uplink in the cell, PPowerClass is the maximum RF output power (dBm) of the UE as per power class, Qoffsettemp is the offset (dB) temporarily applied to the cell, Squal is the cell selection quality value (dB), Qqualmeas is the measured cell quality value (corresponding to the RSRQ), and Qqualmin is the minimum required quality level in the cell)

According to an embodiment of the present disclosure, the method may further comprise, when the first condition is not met, obtaining second received power-related information for a corresponding reference signal using at least one value (e.g., a maximum value) or combined value (e.g., a mean value) of received power values or received quality values for reference signals received from the first cell through the plurality of antennas, determining whether the second received power-related information meets the first condition, and when the second received power-related information meets the first condition, forming a connection with the first cell or transmitting at least a portion of the second received power-related information to the first cell or the second cell. The first received power-related value may correspond to a RSRP corresponding to a value obtained by linearly averaging the received power of resource elements including a cell-specific reference signal in a measured bandwidth and/or a RSRQ defined by N*RSRP/RSSI (where RSSI is a receiver signal strength indicator and corresponds to the total received power of resource elements in the measured bandwidth, and N corresponds to the number of resource blocks for which the RSSI is measured).

According to an embodiment of the present disclosure, the first received power-related information may be produced based on a RSRP corresponding to a value obtained by linearly averaging the received power of resource elements including a cell-specific reference signal in a measured bandwidth and/or a RSRQ defined by N*RSRP/RSSI (where RSSI is a receiver signal strength indicator and corresponds to the total received power of resource elements in the measured bandwidth, and N corresponds to the number of resource blocks for which the RSSI is measured).

According to an embodiment of the present disclosure, the first condition may be defined as follows:

$Srxlev>0$ AND $Squal>0$, where, $Srxlev = Q_{rxlevmeas} - (Q_{rxlevmin} + Q_{rxlevminoffset}) - P\text{compensation} - Q\text{offset}_{temp}$ $Squal = Q_{qualmeas} - (Q_{qualmin} + Q_{qualminoffset}) - Q\text{offset}_{temp}$ (where, Srxlev is the cell selection Rx level value (dB), Qrxlevmeas is the measured cell Rx level value (i.e., RSRP), Qrxlevmin is the minimum required Rx level in the cell (dBm), Qrxlevminoffset is an offset for Qrxlevmin considered as a result of periodic discovery for a higher-priority public land mobile network (PLMN) while in normal connection with a visiting PLMN, Pcompensation is max(PEMAX−PPowerClass, 0)(dB), PEMAX is the maximum Tx power level value (dBm) available when the user equipment (UE) performs transmission on uplink in the cell, PPowerClass is the maximum RF output power (dBm) of the UE as per power class, Qoffsettemp is the offset (dB) temporarily applied to the cell, Squal is the cell selection quality value (dB), Qqualmeas is the measured cell quality value (corresponding to the RSRQ), and Qqualmin is the minimum required quality level in the cell)

According to an embodiment of the present disclosure, the method may further comprise, when the first condition is not met, forming a connection with a second network different from the first network.

According to an embodiment of the present disclosure, the method may further comprise, when the first condition is not met, forming a connection with the second cell.

According to an embodiment of the present disclosure, forming a connection with the first cell may include transmitting a random access preamble to the first cell and receiving a random access response message including link allocation information from the first cell.

According to an embodiment of the present disclosure, forming a connection with the first cell may include transmitting a random access preamble to the first cell, receiving a random access response message including link allocation information from the first cell, and transmitting a radio resource control (RRC) connection request message to the first cell.

According to an embodiment of the present disclosure, forming a connection with the first cell may include transmitting a random access preamble to the first cell, receiving a random access response message including link allocation information from the first cell, transmitting a radio resource control (RRC) connection request message to the first cell, and receiving a contention resolution message from the first cell in response to the RRC connection request message.

According to an embodiment of the present disclosure, the method may further comprise at least one sync signal from the first cell and obtaining a cell ID of the first cell using information included in the sync signal.

According to an embodiment of the present disclosure, the method may further comprise receiving information regarding the first cell from the second cell and forming a connection with the first cell using the information regarding the first cell.

According to an embodiment of the present disclosure, the method may further comprise receiving the information regarding the first cell from the second cell and forming a connection with the first cell using the information regarding the first cell. Forming the connection with the first cell may include transmitting a random access preamble to the first cell and receiving a random access response message including link allocation information from the first cell.

The term 'module' may refer to a unit or circuitry including one of hardware (e.g., circuitry), software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of a processor (e.g., processing circuitry, such as a CPU) application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out example embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing commands configured to be executed by at least one processor to enable the at least one processor to perform at least one operation, wherein the at least one operation may include a method for selecting a cell by an electronic device including a plurality of antennas comprises obtaining first received power-related information for a reference signal received from a first cell of a first network through a first antenna configured to transmit and/or receive signals among the plurality of antennas, determining whether the first received power-related information meets a preset first condition, and when the first received power-related information meets the first condition, forming a connection with the first cell or transmitting at least a portion of the first received power-related information to the first cell or a second cell of the first network.

The example embodiments disclosed herein are provided for description and understanding of the disclosed technology and does not limit the scope of the present disclosure. Accordingly, the scope of the present disclosure should be interpreted as including all changes or various embodiments based on the technical spirit of the present disclosure.

What is claimed is:

1. A method for selecting a cell by an electronic device including a plurality of antennas, the method comprising:
   obtaining first received power-related information for a reference signal received from a first cell of a first network through a first antenna of the plurality of antennas, wherein the first antenna is configured to both transmit and receive signals, and a second antenna of the plurality of antennas is configured to receive signals that are related to the reference signal;
   determining whether the first received power-related information, received via only the first antenna, meets a preset first condition; and
   forming a connection with the first cell or transmitting at least a portion of the first received power-related information to the first cell or a second cell of the first network when the first received power-related information meets the first condition.

2. The method of claim 1, further comprising obtaining the first received power-related information for a reference signal output from the first antenna.

3. The method of claim 1, further comprising:
   when the first condition is not met, obtaining second received power-related information for a corresponding reference signal using at least one value or combined value of received power values or received quality values for reference signals received from the first cell through the plurality of antennas;
   determining whether the second received power-related information meets the first condition; and
   forming a connection with the first cell or transmitting at least a portion of the second received power-related information to the first cell or the second cell when the second received power-related information meets the first condition.

4. The method of claim 1, further comprising:
   obtaining second received power-related information for the reference signal received from the first cell through the second antenna when the first condition is not met;
   determining whether the second received power-related information meets the first condition; and
   forming a connection with the first cell or transmitting at least a portion of the second received power-related information to the first cell or the second cell when the second received power-related information meets the first condition.

5. The method of claim 1, further comprising:
   obtaining third received power-related information for a reference signal received from the second cell through the first antenna when the first condition is not met;
   determining whether the third received power-related information meets the first condition; and
   forming a connection with the second cell or transmitting at least a portion of the third received power-related information to the first cell or the second cell when the third received power-related information meets the first condition.

6. The method of claim 1, further comprising:
   determining whether a preset second condition is met;
   obtaining second received power-related information for a corresponding reference signal using at least one value or combined value of received power values or received quality values for reference signals received from the first cell through the plurality of antennas when the second condition is not met;
   determining whether the second received power-related information meets the first condition; and
   forming a connection with the first cell or transmitting at least a portion of the second received power-related information to the first cell or the second cell when the second received power-related information meets the first condition.

7. The method of claim 1, wherein the first received power-related information includes at least one of a received power value of the reference signal, a received quality value of the reference signal, a cell selection Rx value determined based on a difference between the received power value of the reference signal and a first threshold, and a cell selection quality value determined based on a difference between the received quality value of the reference signal and a second threshold.

8. The method of claim 1, wherein the first received power-related information includes at least one of a cell selection Rx value and a cell selection quality value, wherein the cell selection Rx value is determined based on a difference between a received power value of the reference signal and a first threshold, and the cell selection quality value is determined based on a difference between a received quality value of the reference signal and a second threshold, and wherein the first condition includes a condition wherein at least one of the cell selection Rx value and the cell selection quality value is greater than a preset threshold.

9. The method of claim 1, wherein forming the connection with the first cell includes transmitting a random access preamble to the first cell and receiving a random access response message including link allocation information from the first cell.

10. The method of claim 1, wherein forming the connection with the first cell includes transmitting a random access preamble to the first cell, receiving a random access response message including link allocation information from the first cell, transmitting a radio resource control (RRC) connection request message to the first cell, and receiving a contention resolution message from the first cell in response to the RRC connection request message.

11. An electronic device, comprising:
    a plurality of antennas; and
    a processor configured to obtain first received power-related information for a reference signal received from a first cell of a first network through a first antenna of the plurality of antennas, wherein the first antenna is configured to both transmit and receive signals, and the second antenna is configured to receive signals that are related to the reference signal, to determine whether the first received power-related information, received via only the first antenna, meets a preset first condition, and to form a connection with the first cell or transmit at least a portion of the first received power-related information to the first cell or a second cell of the first network when the first received power-related information meets the first condition.

12. The electronic device of claim 11, wherein the processor is configured to obtain the first received power-related information for a reference signal output from the first antenna.

13. The electronic device of claim 11, wherein the processor is configured to, when the first condition is not met, obtain second received power-related information for a corresponding reference signal using at least one value or combined value of received power values or received quality values for reference signals received from the first cell through the plurality of antennas, to determine whether the second received power-related information meets the first condition, and when the second received power-related information meets the first condition, to form a connection with the first cell or transmit at least a portion of the second received power-related information to the first cell or the second cell.

14. The electronic device of claim 11, wherein the processor is configured to obtain second received power-related information for the reference signal received from the first cell through the second antenna when the first condition is not met, to determine whether the second received power-related information meets the first condition, and when the second received power-related information meets the first condition, to form a connection with the first cell or transmit at least a portion of the second received power-related information to the first cell or the second cell.

15. The electronic device of claim 11, wherein the processor is configured to obtain third received power-related information for the reference signal received from the second cell through the first antenna when the first condition is not met, to determine whether the third received power-related information meets the first condition, and when the third received power-related information meets the first condition, to form a connection with the second cell or transmit at least a portion of the third received power-related information to the first cell or the second cell.

16. The electronic device of claim 11, wherein the processor is configured to determine whether a preset second condition is met, when the second condition is not met, to obtain second received power-related information for a corresponding reference signal using at least one value or combined value of received power values or received quality values for reference signals received from the first cell through the plurality of antennas, to determine whether the second received power-related information meets the first condition, and when the second received power-related information meets the first condition, to form a connection with the first cell or transmit at least a portion of the second received power-related information to the first cell or the second cell.

17. The electronic device of claim 11, wherein the first received power-related information is determined based on a reference signal received power (RSRP) or a reference signal received quality (RSRQ).

18. The electronic device of claim 11, wherein the first received power-related information includes a cell selection Rx level value (Srxlev) or a cell selection quality value (Squal).

19. The electronic device of claim 11, wherein the processor is configured to, when the first condition is met, transmit a random access preamble to the first cell and to receive a random access response message including link allocation information from the first cell.

20. The electronic device of claim 11, wherein the processor is configured to receive information on the first cell from the second cell, to transmit a random access preamble to the first cell, and to receive a random access response message including link allocation information from the first cell.

* * * * *